(12) United States Patent
Nakano

(10) Patent No.: US 6,999,400 B1
(45) Date of Patent: Feb. 14, 2006

(54) LENS, OPTICAL PICKUP DEVICE, AND METHOD FOR DETECTING LENS INCLINATION

(75) Inventor: Ikuo Nakano, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 731 days.

(21) Appl. No.: 09/619,279

(22) Filed: Jul. 19, 2000

(30) Foreign Application Priority Data

Jul. 19, 1999 (JP) .................................. 11-205194

(51) Int. Cl.
   *G11B 7/135* (2006.01)
(52) U.S. Cl. .................................. 369/112.23; 359/719
(58) Field of Classification Search .................. 369/112.23–112.26; 359/718, 719
   See application file for complete search history.

(56) References Cited

U.S. PATENT DOCUMENTS

| | | | |
|---|---|---|---|
| 5,276,663 A * | 1/1994 | Suzuki | 369/44.23 |
| 5,283,600 A * | 2/1994 | Imai | 353/34 |
| 5,708,635 A * | 1/1998 | Ichiura et al. | 369/44.24 |
| 5,742,383 A * | 4/1998 | Jeon | 356/138 |
| 5,768,227 A * | 6/1998 | Baba | 369/44.28 |
| 5,875,167 A * | 2/1999 | Katayama | 369/112.07 |
| 5,883,709 A * | 3/1999 | Okuda et al. | 356/138 |
| 5,974,020 A * | 10/1999 | Ju et al. | 369/112.17 |
| 5,995,304 A * | 11/1999 | Nomura et al. | 359/726 |
| 6,057,969 A * | 5/2000 | Shoji et al. | 359/694 |
| 6,285,508 B1 * | 9/2001 | Ai et al. | 359/664 |

FOREIGN PATENT DOCUMENTS

| | | |
|---|---|---|
| JP | 05-006561 | 1/1993 |
| JP | 6-59172 | 3/1994 |
| JP | 10-116438 | 5/1998 |
| JP | 10-255304 | 9/1998 |
| JP | 2000-019304 | 1/2000 |
| JP | 2000-227545 | 8/2000 |

OTHER PUBLICATIONS

Japanese Patent Office Action with English translation. Tokukaihei 10-116438, dated May 6, 1998.

* cited by examiner

*Primary Examiner*—Brian E. Miller
*Assistant Examiner*—Michael V. Battaglia
(74) *Attorney, Agent, or Firm*—David G. Conlin; David A. Tucker; Edwards Angell Palmer & Dodge LLP

(57) ABSTRACT

A lens includes a plane surface whose normal direction virtually conforms to an optical axis direction, and a reflecting part is provided on the plane surface to reflect only light within a predetermined waveband. Consequently, inclination of the lens can be detected with high accuracy.

29 Claims, 16 Drawing Sheets

LENS, OPTICAL PICKUP DEVICE, AND METHOD FOR DETECTING LENS INCLINATION

FIELD OF THE INVENTION

The present invention relates to lenses mounted in an optical pickup device and other devices, the optical pickup device having the lens, and a method for detecting lens inclination.

BACKGROUND OF THE INVENTION

As a conventional technique, for example, Japanese Unexamined Patent Publication No. 116438/1998 (Tokukaihei 10-116438, published on May 6, 1998) discloses a method for detecting inclination of an object lens in an optical pickup device. The method is discussed referring to FIG. 16.

In FIG. 16, an object lens 101 has a curved surface (lens functioning section) 101a acting as a lens, and a ring-shaped plane surface 101b at the circumference. The normal direction of the plane surface 101b virtually conforms to an optical axis direction of the object lens 101.

Light is emitted from a light source 102, is transmitted through a pin hole 103, which is disposed ahead of the light source 102, is converted into a parallel light pencil through a collimate lens 104, is reflected on a beam splitter 105, and is emitted into the object lens 101.

Light emitted into the object lens 101 is partially reflected on the curved surface 101a and the plane surface 101b and the rest passes through the object lens 101. In this case, the reflectivity depends upon a refractive index of a material forming the object lens 101, and an entry angle of light. Normally, light has a small reflectivity of several percents.

Light reflected on the curved surface 101a and the plane surface 101b is transmitted through the beam splitter 105, and is directed to a light-receiving element 107 through the collimate lens 106. A CCD and the like is used as the light-receiving element 107.

Light reflected on the plane surface 101b forms a condensing spot on a point of the light-receiving element 107, and light reflected on the curved surface 101a forms a spot expanding around the condensing spot. Here, a position of a condensing spot on the light-receiving element 107 is detected so as to detect the inclination of the object lens 101. The condensing spot is formed by light reflected on the plane surface 101b. This conventional arrangement detects the inclination of the object lens 101 by detecting on the light-receiving element 107 a condensing spot position of light which is reflected from the plane surface 101b. However, on the light-receiving element 107, a light spot is formed by the curved surface 101a around a condensing spot formed by the plane surface 101b, so that it is difficult to separate the condensing spot of the plane surface 101b and the spot of the curved surface 101a, resulting in deterioration in accuracy of detecting a position of a condensing spot formed by the plane surface 101, namely, accuracy of detecting the inclination of the object lens 101.

Moreover, in view of light reflected from the beam splitter 105 as well, the accuracy of detecting is further deteriorated. To be specific, light reflected from a surface of the beam splitter 105 is also emitted onto the light-receiving element 107; however, the beam splitter 105 also has a plane surface, so that a condensing spot is formed on a point of the light-receiving element 107. The reflectivity on the surface of the beam splitter 105 is virtually the same as that of the plane surface 101b of the object lens 101; thus, it is further difficult to separate the condensing spots on the light-receiving element 107.

In order to solve the above problem, Japanese Unexamined Patent Publication No. 59172/1994 (Tokukaihei 6-59172, published on Mar. 4, 1994) discloses that the plane surface 101b has a reflecting part for increasing reflected light.

However, with this arrangement, it is difficult to, for example, sufficiently eliminate the influence of the curved surface 101a and to detect the inclination of lens with high accuracy of detecting.

Further, for example, a combination of a plurality of lenses is also applicable for the object lens; however, Japanese Unexamined Patent Publication No. 116438/1998 does not disclose inclination detection of a lens having such an arrangement.

SUMMARY OF THE INVENTION

The objective of the present invention is to provide a lens for detecting inclination with high accuracy, an optical pickup device, and a method for detecting lens inclination.

In order to attain the above objective, a lens of the present invention includes:
  a curved surface having a function as a lens,
  a plane surface disposed in a virtually perpendicular direction to an optical axis, and
  a reflecting part which is disposed on the plane surface, reflects light within a predetermined waveband with reflectivity higher than the curved surface, and transmits light outside the waveband.

According to this arrangement, the lens includes the curved surface and the plane surface, and the plane surface is disposed in a virtually perpendicular direction to an optical axis.

In a conventional optical pickup device and the like including a lens having such a construction, light is emitted to the lens and lens inclination is detected according to a position of a condensing spot which is formed by light reflected from the plane surface. However, light reflected from the curved surface of the lens also forms a light spot around the condensing spot for detecting inclination, so that it was not possible to separate the condensing spot formed by light reflected from the plane surface to detect lens inclination. Thus, lens inclination could not be detected with sufficient accuracy. Further, the conventional art is not devised to achieve both of the following characteristics: inclination with high accuracy is detected by using light reflected from the lens, and stray light is positively prevented that is resulted from unnecessary light reflected on the lens.

Meanwhile, according to the arrangement of the present invention, the reflecting part is disposed on the plane surface, and the reflecting part reflects light within a predetermined waveband with reflectivity higher than the curved surface and transmits light outside the waveband.

Hence, light within a predetermined waveband is reflected on the reflecting part with reflectivity higher than the curved surface, so that a condensing spot of the reflected light is larger in quantity of light as compared with a light spot reflected from the curved surface. In this way, a condensing spot reflected from the reflecting part can be separated from other spots based on a difference in quantity of light, so that lens inclination can be detected with sufficiently high accuracy. Moreover, a condensing spot used for detecting inclination has a large quantity of light so as to improve sensitivity for detection.

In addition, the reflecting part transmits light outside the waveband; therefore, light used for recording and reproducing a signal in an optical pickup device is positively transmitted but does not cause stray light in the device.

For this reason, the lens having the above construction of the present invention is used for the optical pickup device and the like so as to detect lens inclination with high accuracy and to positively prevent stray light occurring in the device.

Furthermore, in order to attain the foregoing objective, an optical pickup device of the present invention includes:

a plurality of lenses disposed in an optical axis direction with predetermined intervals, assuming that a receiving side for inclination detection light is a front side, each of the lenses having a plane surface disposed on a front-facing surface thereof in a virtually perpendicular direction to the optical axis, a plurality of the lenses each being larger in diameter than the preceding one.

According to this arrangement, a plurality of the lenses are disposed in an optical axis direction with predetermined intervals, and each of the lenses has the plane surface in a virtually perpendicular direction to an optical axis. Regarding a plurality of the lenses disposed in this manner, inclination needs to be detected for each of the lenses.

Thus, according to the arrangement of the present invention, assuming that the light-receiving side for inclination detection is the front side, each of the lenses has the plane surface on the front thereof. A plurality of the lenses are each larger in diameter than the preceding one.

Consequently, the light can be positively emitted to the plane surface of the lens without interfering with light emitted to the following lens for detecting inclination. Hence, inclination of the lenses can be separately detected according to positions of condensing spots formed by light reflected from the plane surfaces of the lenses.

Besides, in order to attain the foregoing objective, a method for detecting lens inclination of the present invention includes:

a step 'a' of emitting light for detecting inclination to a plurality of lenses so as to emit the light to plane surfaces thereof, the plane surfaces being disposed in a virtually perpendicular direction to an optical axis, the lenses being disposed in an optical axis direction with predetermined intervals, and a step 'b' of detecting a position of a condensing spot formed by light reflected from said plane surface on each of the lenses.

According to this method, light for detecting inclination is emitted to the plane surfaces of the lenses, and positions of condensing spots are each detected, which are formed by light reflected from the plane surfaces. Thus, inclination can be detected for each of the lenses.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a side view showing the same.

FIG. 3(*b*) is a side vie showing the same.

FIG. 4(*b*) is a side vie showing the same.

FIG. 6(*b*) is a side view showing the same. FIG. 6(*c*) is an elevational view showing a lens with smaller diameter of the combined lenses shown in FIG. 6(*a*), taken in an optical axis direction. FIG. 6(*d*) is a side view showing the same. FIG. 6(*e*) is an elevational view showing a lens with larger diameter of the combined lenses shown in FIG. 6(*a*), taken in an optical axis direction. FIG. 6(*f*) is a side view showing the same.

FIG. 9(*b*) is a side view showing the same. FIG. 9(*c*) is an elevational view showing a lens with smaller diameter of the combined lenses shown in FIG. 9(*a*), taken in an optical axis direction. FIG. 9(*d*) is a side view showing the same. FIG. 9(*e*) is an elevational view showing a lens with larger diameter of the combined lenses shown in FIG. 9(*a*), taken in an optical axis direction. FIG. 9(*f*) is a side view showing the same.

FIG. 13(*b*) is a longitudinal section showing the combined lens tube.

FIG. 14(*b*) is a longitudinal section showing the combined lens tube.

DESCRIPTION OF THE EMBODIMENTS

Embodiment 1

Referring to FIGS. 1(*a*) and 1(*b*) to 4(*a*) and 4(*b*), the following explanation describes one embodiment of the present invention.

Figure 2:
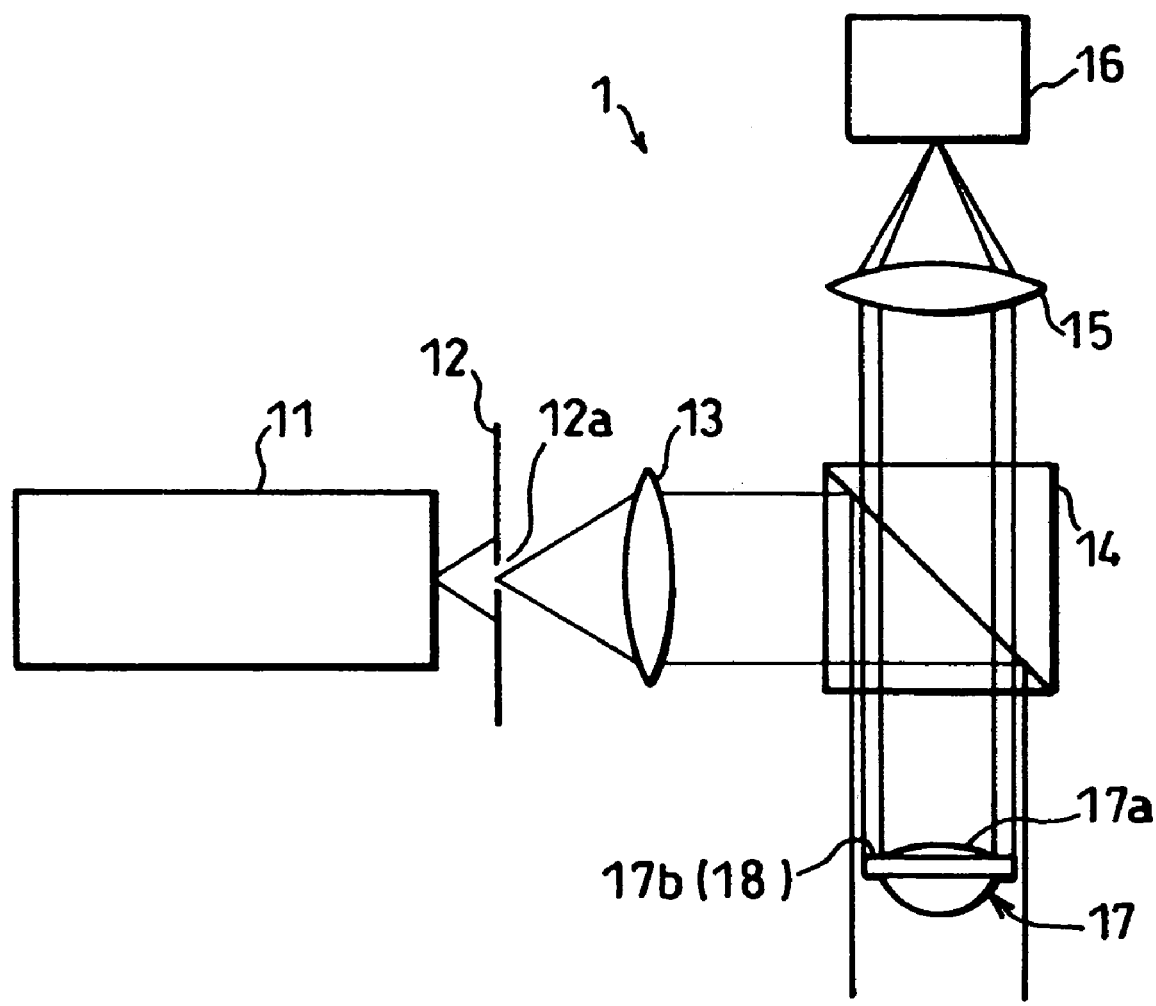
FIG. 2 is a schematic view showing the entire arrangement of a lens inclination detector including the lens shown in FIG. 1.

As shown in FIG. 2, a lens inclination detector 1 of the present embodiment is provided with a light source 11 for emitting a light beam, a pin hole plate 12 having a pin hole 12a, a collimate lens 13, a beam splitter 14, a collimate lens 15, a light-receiving element 16 composed of a CCD and the like, and a lens 17.

Figure 1A:
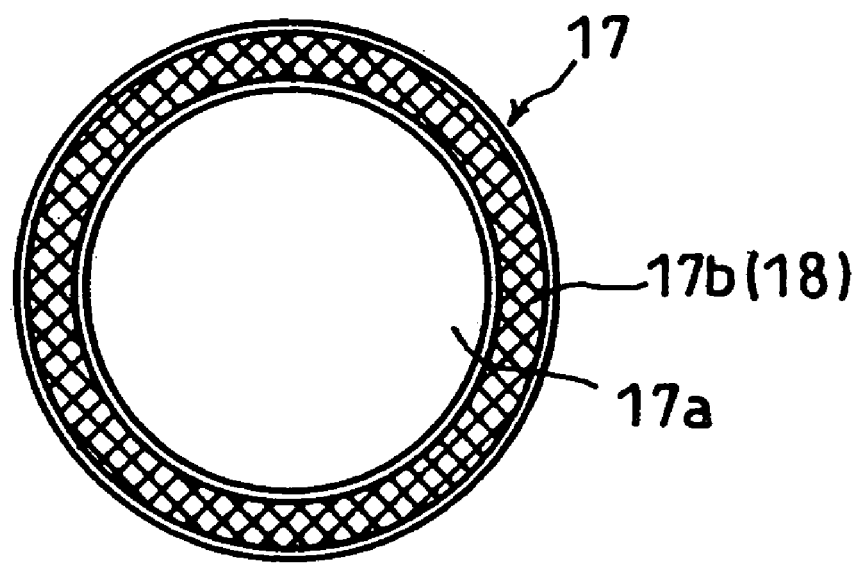
FIG. 1(*a*) is an elevational view showing a lens of one embodiment of the present invention.
Figure 1B:
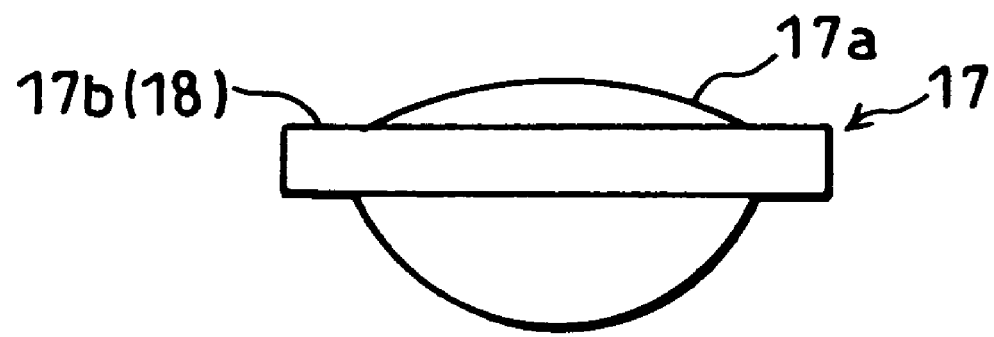

As shown in FIGS. 1(a) and 1(b), the lens 17 has a lens functioning section 17a, which acts as a lens and has convex and curved surfaces, and a plane surface 17b at the circumference. The plane surface 17b has a surface normal direction virtually conforming to an optical axis direction of the lens 17.

The lens 17 can be normally manufactured in a glass or plastic mold. In this case, a surface normal direction of the plane surface 17b is determined by the accuracy of the mold. A mold normally has considerably high accuracy, so that the optical axis direction of the lens 17 can conform to the surface normal direction of the plane surface 17b with high accuracy.

On the plane surface 17b, a reflecting part 18 is formed on the same surface as a plane face of the lens functioning section 17a. The reflecting part 18 is formed on a surface on the side where the lens 17 forms a focus. An aluminum film is formed into the reflecting part 18 by vacuum deposition method, etc.

A light-receiving element such as CCD, which is capable of detecting the position of a condensing spot on a light-receiving surface, is applicable as the light-receiving element 16.

According to this arrangement, light is emitted from the light source 11, is transmitted through the pin hole 12a of the pin hole plate 12, is converted into a parallel light pencil through the collimate lens 13, is reflected on the beam splitter 14, and is emitted onto the lens 17.

The light emitted onto the lens 17 is partially reflected on the curved surface 17a, but the light mostly passes through the lens 17; meanwhile, the light is largely reflected on the reflecting part 18 of the plane surface 17b.

The light reflected on the curved surface 17a and the plane surface 17b is transmitted through the beam splitter 14 and is directed through the collimate lens 15 to the light-receiving element 16.

The light reflected from the plane surface 17b forms a condensing spot on a point of the light-receiving element 16; meanwhile, the light reflected from the curved surface 17a forms a spot expanding around the condensing spot. And then, the position of the condensing spot formed by the plane surface 17b is detected on the light-receiving element 16 so as to detect the inclination of the lens 17.

In this case, on the light-receiving element 16, a light spot is formed by the curved surface 17a around a condensing spot of the plane surface 17b, and a condensing spot is further formed by light reflected from the beam splitter 14. However, a condensing spot formed by the plane surface 17b has a relatively large quantity of light because of the reflecting part 18. Thus, a condensing spot formed by the plane surface 17b can be readily separated on the light-receiving element 16.

In this way, the reflecting part 18 is formed on the plane surface 17b so as to improve the reflectivity of light on the plane surface 17b. Therefore, it is possible to detect light reflected from the plane surface 17b of the lens 17. Further, an aluminum film is used as the reflecting part 18, so that the range of choices is larger regarding a wavelength of the light source 11, which is used for detecting the inclination of the lens 17. Moreover, an aluminum film is used as the reflecting part 18, so that the reflecting part 18 can be readily formed by vacuum deposition. Consequently, the lens 17 can be mass-manufactured at low cost.

Figure 3A:
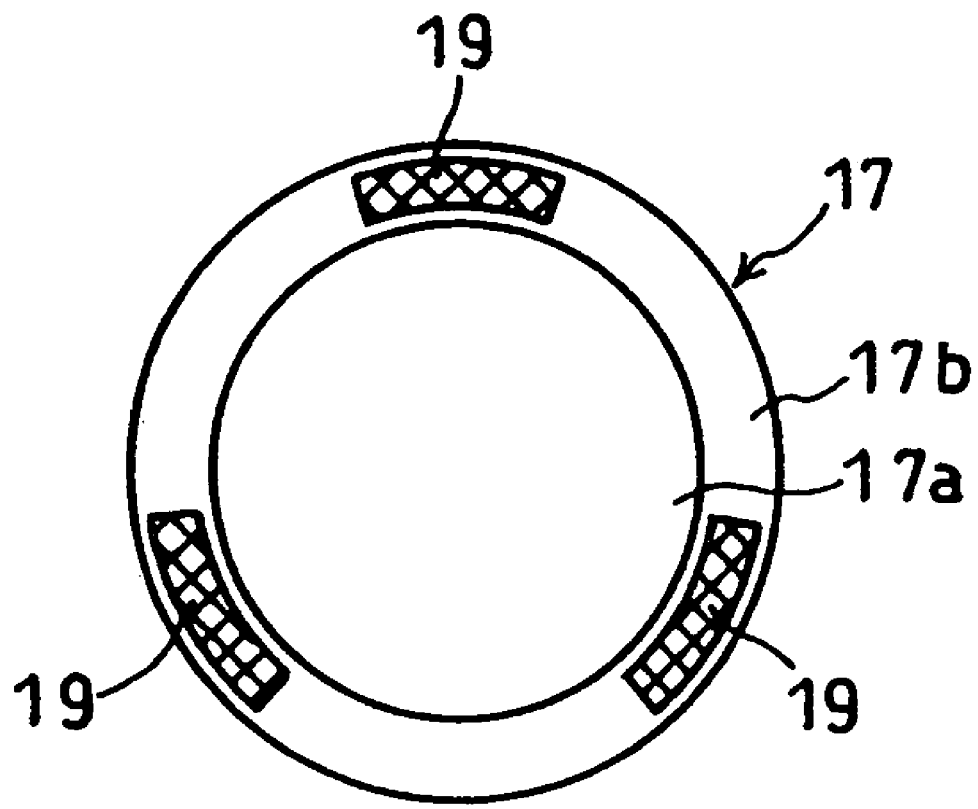
FIG. 3(*a*) is an elevational view showing another example of the lens shown in FIG. 1.
Figure 3B:
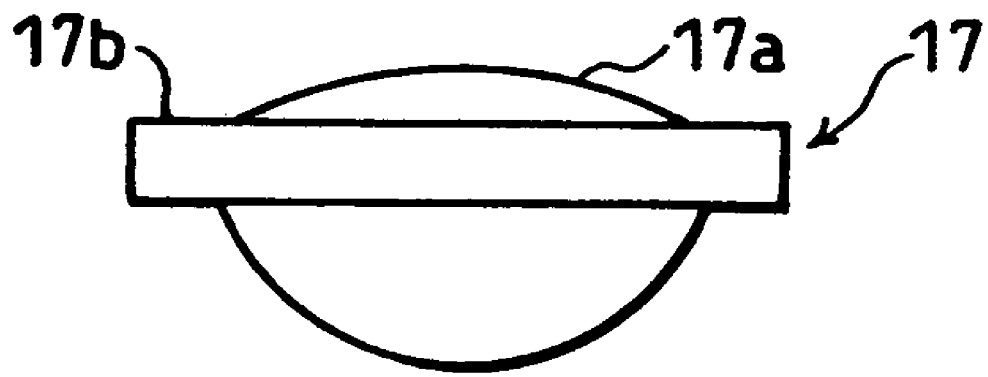

Here, the lens 17 can include reflecting parts 19 shown in FIG. 3(a) instead of the reflecting part 18. Unlike the reflecting part 18, the reflecting parts 19 are not formed into a ring but into a partial arc on the plane surface 17b, specifically, on three places of the plane surface 17b.

Figure 4:
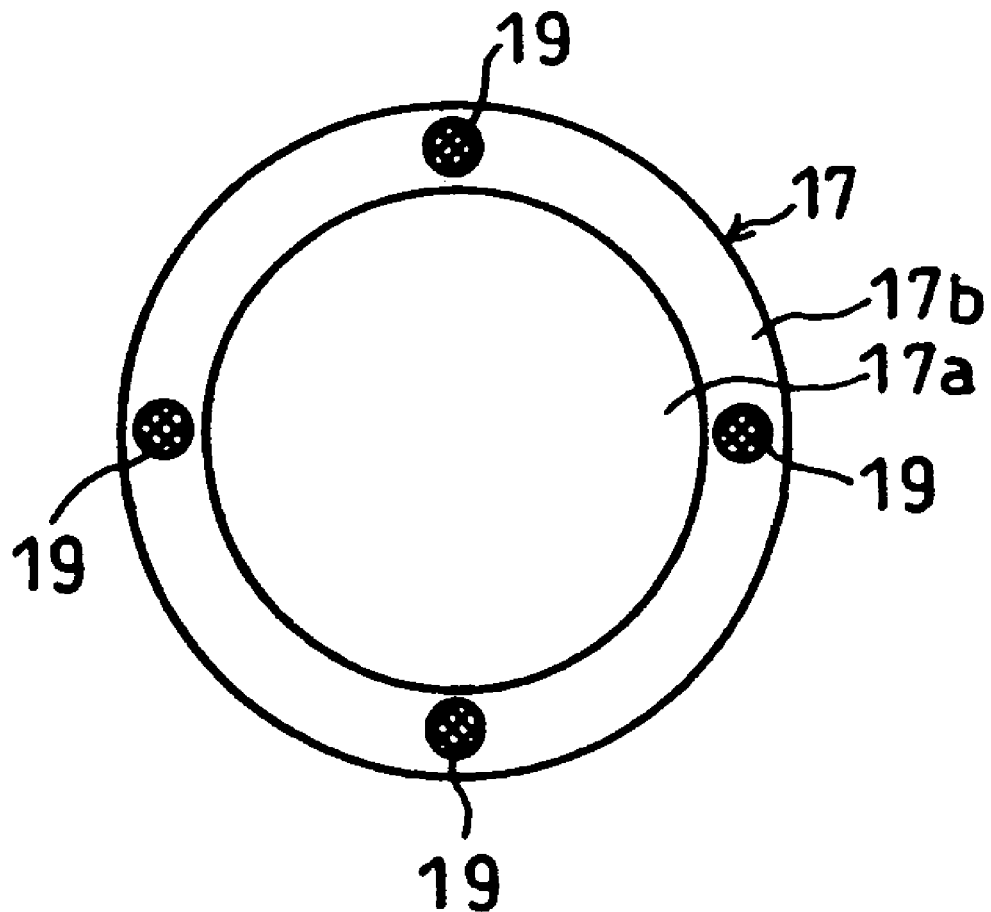
FIG. 4(*a*) is an elevational view showing still another example of the lens shown in FIG. 1.
Figure 4:
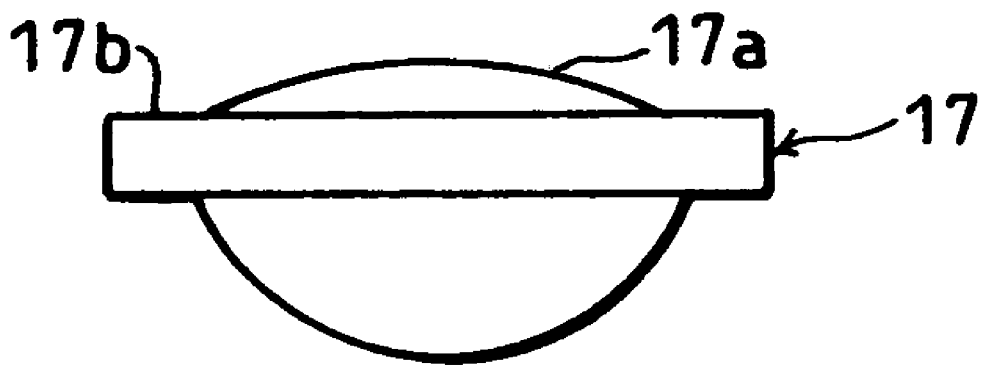

The number of reflecting parts 19 is not particularly limited as long as the reflecting parts 19 are provided on one or more places. Additionally, the shape of the reflecting part 19 is not particularly limited. As shown in FIG. 4(a), a circular shape is also applicable.

Here, regarding the reflecting parts 18 and 19, it is more desirable to stack a dielectric film on an aluminum film than to use a single layer made of aluminum. Thus, in this case, the reflectivity can be further improved as compared with a single layer made of aluminum. Therefore, with an inexpensive arrangement, it is possible to further improve the accuracy of detecting the inclination of the lens 17 based on reflected light (returned light) from the reflecting parts 18 and 19. Such a dielectric film is made of a material including $MgF_2$, $TiO_2$, and $SiO_2$.

Also, the reflecting parts 18 and 19 can be composed of dielectric films. The reflecting parts 18 and 19 can be formed by, for example, stacking a multiple-layer dielectric film. This arrangement is more preferable than an aluminum film because only light within a specific waveband is reflected.

Additionally, the following explanation discusses the construction using the lens inclination detector 1 for the optical pickup device. When an infrared ray is used as a signal recording/reproducing light of a recording medium in the optical pickup device, the reflecting parts 18 and 19 are composed of a dielectric film, which transmits an infrared light and reflects light outside the waveband, so that stray light appearing in the optical pickup device can be prevented. In this case, the inclination of the lens 17 can be detected based on light waveband outside the infrared region (for example, green and blue). Such a dielectric film is made of a material including $MgF_2$, $TiO_2$ and $SiO_2$.

Further, when the lens 17 is a mold lens made of glass and plastic or a lens manufactured by grinding, it is also possible to mount later the plane surface 17b to the lens 17 to detect the inclination of the lens 17.

As described above, the lens 17 of the present invention is provided with the curved surface 17a acting as a lens, the plane surface 17b disposed in a virtually perpendicular direction to an optical axis, and the reflecting parts 18 and 19, which are disposed on the plane surface 17b, reflect light being within a predetermined waveband with a reflectivity higher than the curved surface 17a, and transmit light outside the waveband. It is therefore possible to achieve position adjustment using light reflected from the reflecting parts 18 and 19, and reduction in stray light in a recording and reproducing process.

Embodiment 2

Referring to FIGS. 5 to 9(a) and 9(f), the following explanation describes another embodiment of the present invention. Here, for convenience of explanation, those means that have the same functions described in the means of the forgoing figures are indicated by the same reference numerals and the description thereof is omitted.

Figure 5:
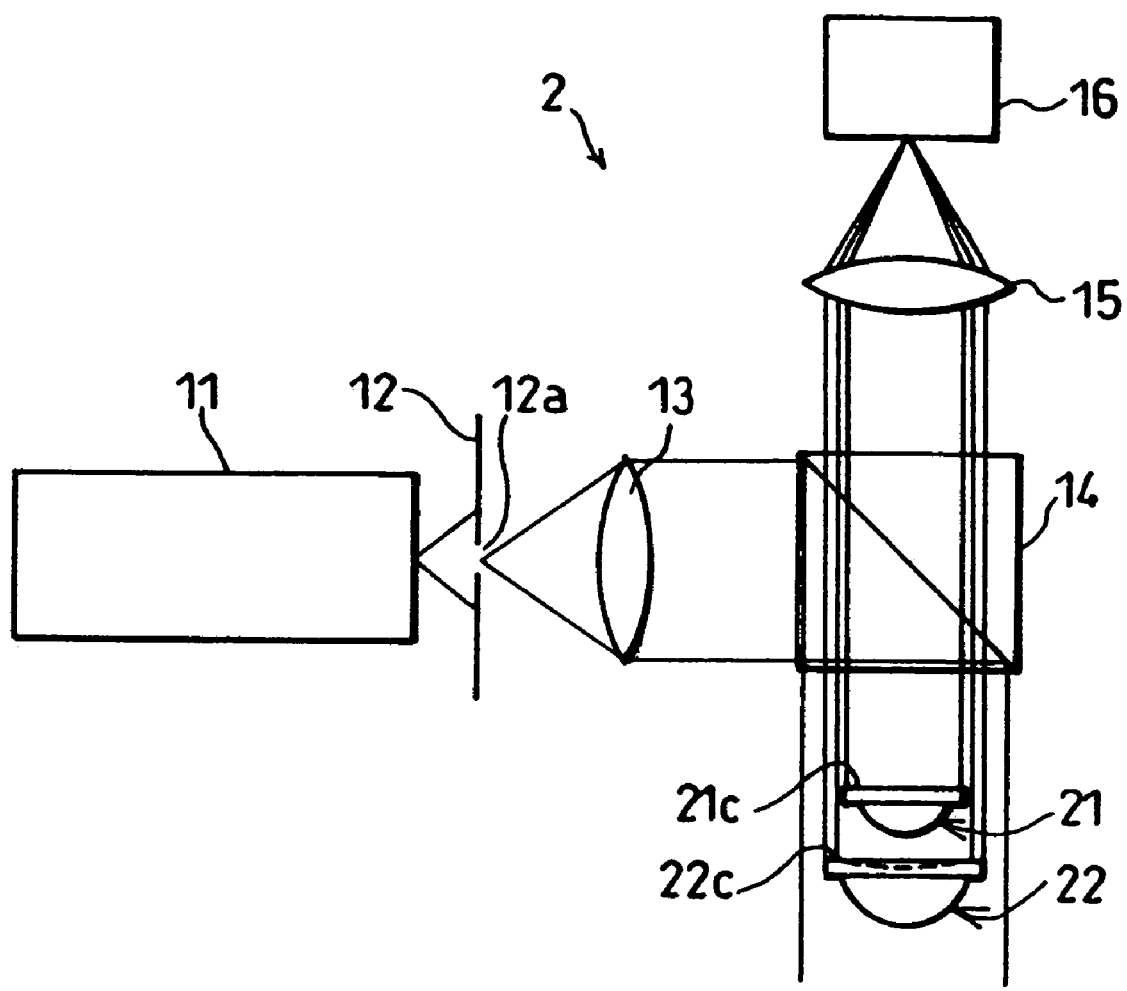
FIG. 5 is a schematic view showing the entire arrangement of a lens inclination detector in accordance with another embodiment of the present invention.
Figure 6A:
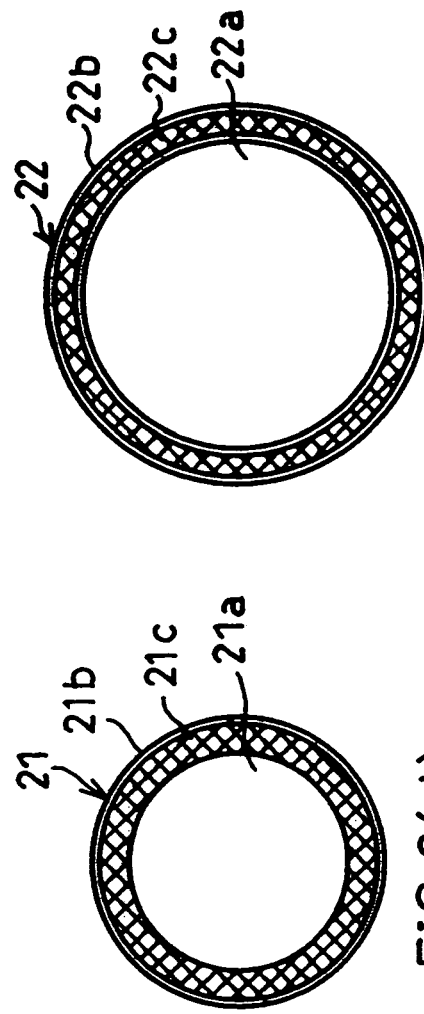
FIG. 6(*a*) is an elevational view showing combined lenses of FIG. 5, taken in an optical axis direction.
Figure 6B:
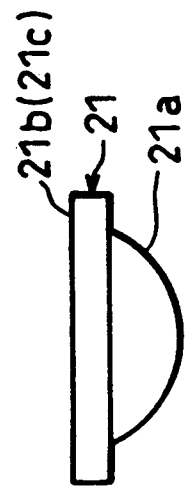
Figure 6C:
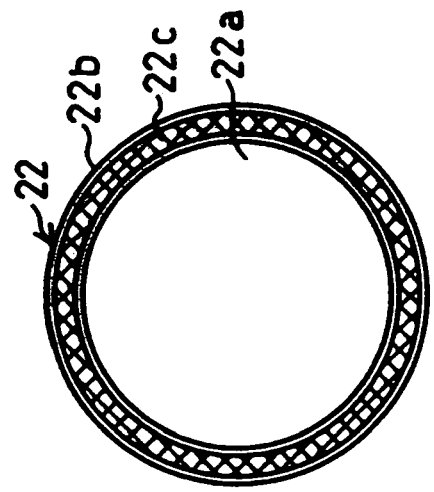
Figure 6D:
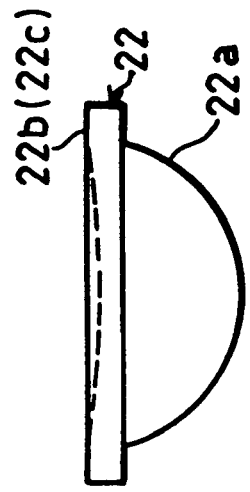
Figure 6E:
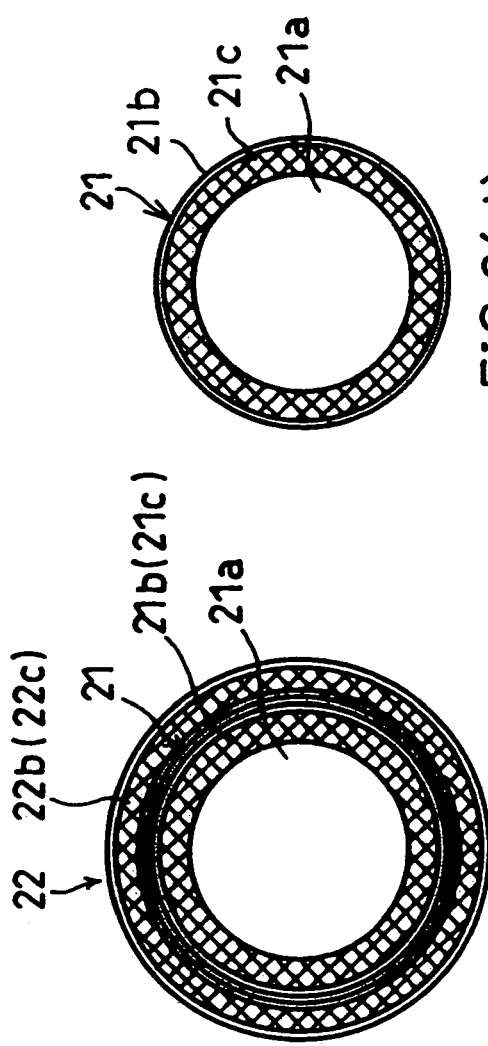
Figure 6F:
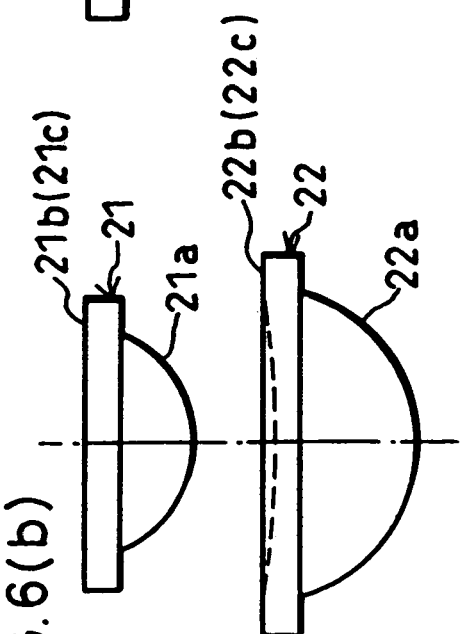

As shown in FIG. 5, a lens inclination detector 2 of the present embodiment is provided with a light source 11, a pin hole plate 12, a collimate lens 13, a beam splitter 14, a collimate lens 15, and a light-receiving element 16. Further, a combination of a plurality of lenses, i.e., lenses 21 and 22 are provided instead of a single lens 17. Additionally, the lenses 21 and 22 are disposed with a predetermined distance in a direction of an optical axis.

Of the lenses 21 and 22, the lens 21 with a smaller diameter is composed of a planoconvex lens, as shown in FIGS. 6(a), 6(b), 6(c), and 6(d). Like the lens 17, the lens 21 includes a planoconvex plane surface 21b on a side of a plane face of a planoconvex lens functioning section 21a at a circumference thereof. A reflecting part 21c is formed on the plane surface 21b. The arrangement of a reflecting part 18 can be selectively adopted as the reflecting part 21c.

Like the plane surface 17b, the plane surface 21b has a surface normal direction virtually conforming to an optical axis direction of the lens 17. The reflecting part 21c is formed on the same surface as the plane surface of the lens functioning section 21a, namely, on a surface on the side for forming a focus of the lens 21. When the lens 21 is used for, for example, an optical pickup device, the reflecting part 21c is formed in an area other than an area for transmitting light into the lens 21, namely, other than the lens functioning section 21a.

Here, when light for performing recording and reproducing in the optical pickup device is within a different waveband from light for detecting the inclination of the lens 21, and when the reflecting part 21c is composed of a dielectric film which reflects light for detecting inclination of the lens 21 and transmits light for recording and reproducing, the reflecting part 21c can be also formed so as to entirely cover one of the surfaces of the lens 21. This arrangement is applicable to the other embodiments as well. The above dielectric film is made of a material such as $MgF_2$, $TiO_2$, and $SiO_2$.

With this arrangement, a reflection preventive film of the lens functioning section 21a and a reflecting film acting as the reflecting part 21c can be simultaneously formed as a single film. Thus, it is more possible to mass-manufacture the lens. The same arrangement is adopted for the lens 22.

Moreover, as shown in FIGS. 6(a), 6(b), 6(e), and 6(f), regarding the lens 22 with a larger diameter, one surface of the lens functioning section 22a is concave and the other surface is convex. On the concave surface at the circumferential of the lens functioning section 22a, the plane surface 22b is formed in the same manner as the lens 21. On the side of the concave surface of the lens functioning section 22a, the reflecting part 22c is formed on the plane surface 22b.

The lens 22 is disposed such that the concave surface thereof opposes the convex surface of the lens 21. Further, the lenses 21 and 22 are arranged such that the reflecting parts 21c and 22c do not overlap each other in an optical axis direction even when the lenses are inclined. In the present embodiment, the outer diameter of the lens 21 is virtually the same as the concave surface of the lens functioning section 22a of the lens 22, that is a parallel light receiving side, and is smaller than the outer diameter of the concave surface. With this arrangement, when inclination of the lenses 21 and 22 is detected, it is possible to simultaneously detect light reflected back from the reflecting parts 21c and 22c of the two lenses 21 and 22.

Besides, in the present embodiment, the reflecting parts 21c and 22c of the two lenses 21 and 22 are virtually the same in area, so that a quantity of light reflected back from the reflecting part 21c of the lens 21 is almost equal to that from the reflecting part 22c of the lens 22 upon detecting inclination of the lenses 21 and 22. With this arrangement, the lens inclination detecting optical system can readily detect light reflected back from the two lenses of lenses 21 and 22, by using only a single light-receiving element 16.

Meanwhile, when the above lenses 21 and 22 are quite different from each other in quantity of returned light, it is necessary to perform operations including switching the sensitivity of the light-receiving element 16. Hence, the working efficiency may be deteriorated. Moreover, for example, in the case of the planoconvex lens 21, light is also reflected from a part other than the reflecting part. Thus, it is also possible to set the areas of the reflecting parts 21c and 22c in view of a quantity of the reflected light.

The quantities of light reflected from the reflecting parts 21c and 22c can be adjusted by changing a film thickness of an aluminum film as well as changing the areas of the reflecting parts 21c and 22c, in the case of the reflecting parts 21c and 22c composed of aluminum films.

With this arrangement, as shown in FIG. 5, light is emitted from the light source 11, is converted into a parallel light pencil through the collimate lens 13, is reflected on the beam splitter 14, and is emitted into a combined structure of the lenses 21 and 22. Light emitted to the lens 21 is reflected on the plane face of the lens functioning section 21a, that faces the beam splitter 14, because the lens 21 is a planoconvex lens. And the light is reflected on the reflecting part 21c. Meanwhile, light passing the outside of the lens 21 is emitted to the plane surface 22b of the lens 22 and is reflected on the reflecting part 22c. Light reflected back from the lenses 21 and 22 forms condensing spots on the light-receiving element 16 through the collimate lens 15.

As shown in FIG. 5, when the lenses 21 and 22 have the same inclination, the condensing spots of light reflected back from the lenses 21 and 22 are formed on the same place on the light-receiving element 16.

Figure 7:
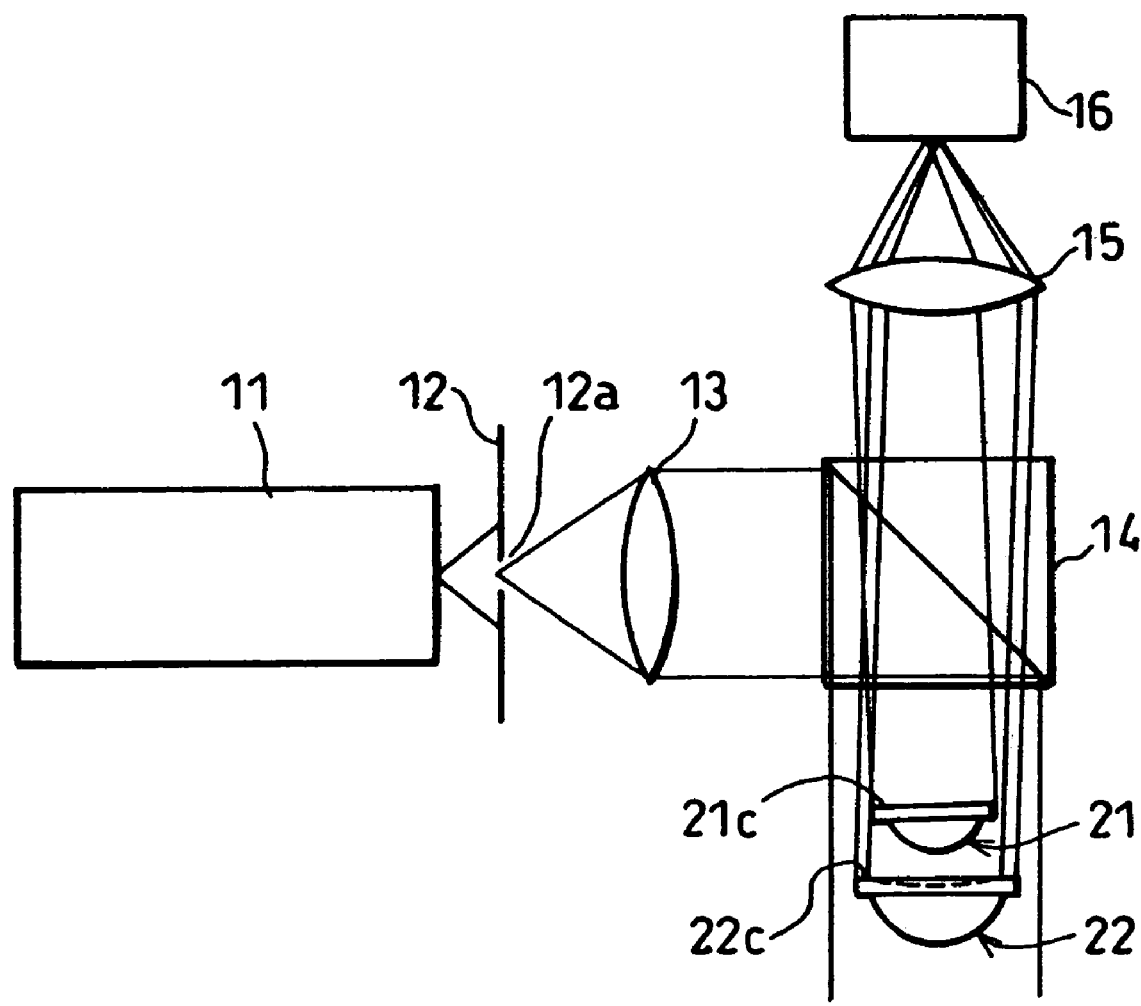
FIG. 7 is an explanatory view showing that two lenses are inclined to each other in the arrangement of FIG. 5.

In contrast, as shown in FIG. 7, when the lenses 21 and 22 are inclined to each other, the condensing spots of light reflected back from the lenses 21 and 22 are formed on different places on the light-receiving element 16. Thus, the inclination of the lenses 21 and 22 is adjusted such that the positions of the spots coincide with each other on the light-receiving element 16, thereby realizing the coincidence of inclination of the lenses 21 and 22.

As described above, the lens inclination detector 2 is capable of detecting inclination of the lenses 21 and 22 according to the positions, on the light-receiving element 16, of the condensing spots formed by light reflected back from the lenses 21 and 22.

In this case, the lens inclination detector 2 is devised to detect the inclination of the lenses 21 and 22 according to the positions of the condensing spots formed by light reflected back from the reflecting parts 21c and 22c on the lenses 21 and 22. Even when the lenses 21 and 22 are integrally provided as members of the optical pickup device, it is possible to detect inclination of the lenses 21 and 22 and relative inclination therebetween.

Additionally, the lens inclination detector 2 may be arranged such that the reflecting parts 21c and 22 of the lenses 21 and 22 are composed of dielectric multi-layer films in which layers respectively reflect light beams within different wavebands, and light reflected back from the lenses 21 and 22 is divided by, for example, a dichroic prism. This arrangement makes it possible to separately detect inclination of the lenses 21 and 22.

Figure 8:
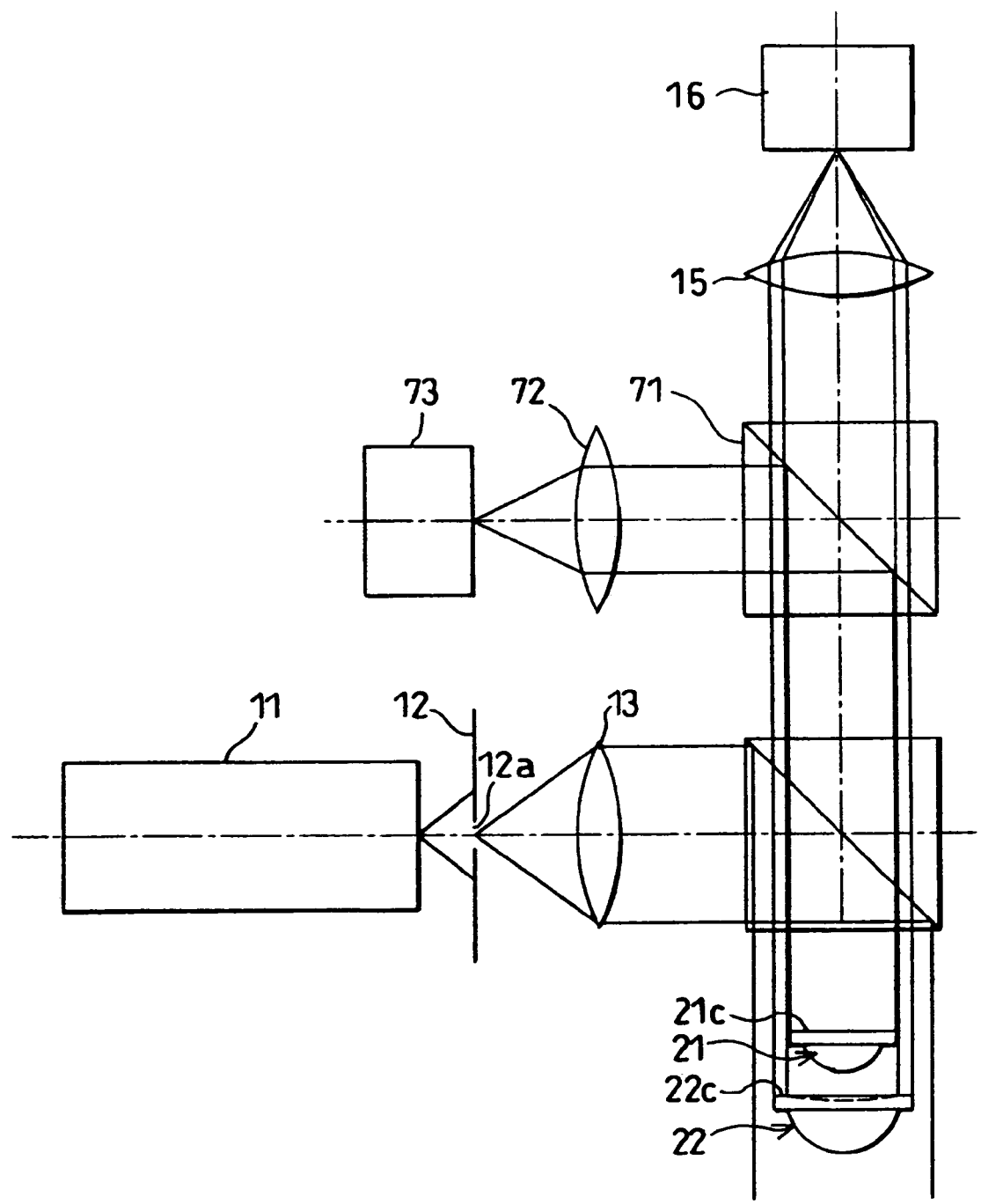
FIG. 8 is a diagram showing the entire arrangement of another example of the inclination detector shown in FIG. 5, in which light reflected from reflecting parts of two lenses is divided before detection.

Such an arrangement is illustrated in FIG. 8. In this arrangement, light reflected from reflecting parts 21c and 22c is divided at a dichroic prism 71, and the light is respectively detected by the collimate lens 15 and the light-receiving element 16; and a collimate lens 72 and a light-receiving element 73.

For example, in the case of an optical pickup device including the lenses 21 and 22, when a waveband of light emitted to the lenses 21 and 22 for recording and reproducing is a red band, light reflected from the reflecting parts 21c and 22c of the lenses 21 and 22 can respectively have a blue band and a green band. This arrangement makes it possible to, for example, reduce the influence of stray light in the optical pickup device. The reflecting parts 21c and 22c can be composed of a dielectric film made of a material such as $MgF_2$, $TiO_2$, and $SiO_2$.

Further, for example, when light having two wavebands of blue and red is used for recording and reproducing in the optical pickup device, it is also possible to form the reflecting parts 21c and 22c for reflecting light in a green waveband on the lenses 21 and 22. Moreover, the inclination of the lenses 21 and 22 can be measured with a single color camera. The reflecting parts 21c and 22c can be composed of a dielectric film made of a material such as $MgF_2$, $TiO_2$, and $SiO_2$.

Also, in the lens inclination detector 2, when detecting lens inclination, a parallel light pencil is emitted to the lenses 21 and 22 having a combined structure. With this arrangement, it is possible to detect inclination regardless of the positions of the lenses 21 and 22 with respect to an optical axis direction and the positions of the lenses 21 and 22 with respect to a plane face with an optical axis serving as a surface normal.

In contrast, in the case of a focused light pencil, the two lenses 21 and 22 are aligned in a direction of an optical axis, so that the size of a condensing spot on the light-receiving element 16 is changed according to the positions of the lenses 21 and 22 with respect to an optical axis. Consequently, the accuracy of detecting the inclination of the lenses 21 and 22 is deteriorated.

Moreover, the reflecting parts 21c and 22c that reflect a light pencil for detecting lens inclination are provided on the plane surfaces 21b and 22b of the lenses 21 and 22; thus, even in the event of a positional shift between a) the center of the light pencil for detecting lens inclination and b) an optical axis of the lenses 21 and 22, it is possible to detect the inclination of the lenses 21 and 22. Meanwhile, when the reflecting parts 21c and 22c are provided on, for example, the curved surfaces of the lenses 21 and 22, it is necessary to provide a step of previously coinciding a) the center of a light pencil for detecting lens inclination with b) the center of an optical axis of the lens.

Additionally, even when the reflecting parts are not provided on the lenses having a combined structure, the same effect can be achieved. In this case, in the combined structure of the lenses, the following arrangement is necessary: a plurality of lenses are aligned in a direction of an optical axis; the plane surfaces having a normal direction virtually conforming to an optical axis direction are provided on the circumferences, the circumferences being on the side for receiving parallel light; and when the front is a side for receiving parallel light, the lens on the back needs to be larger in outer diameter than the lens at the front.

Figure 9A:
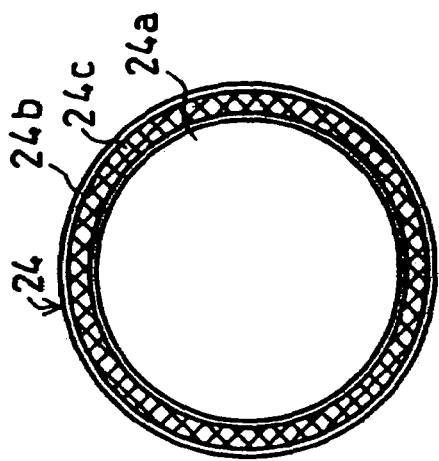
FIG. 9(*a*) is an elevational view showing another example of the combined lenses shown in FIG. 6(*a*), taken in an optical axis direction.
Figure 9B:
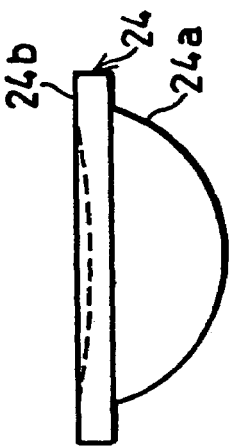
Figure 9C:
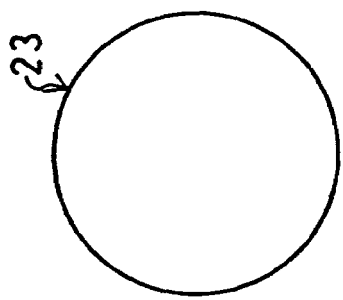
Figure 9D:
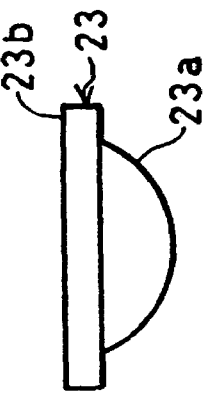
Figure 9E:
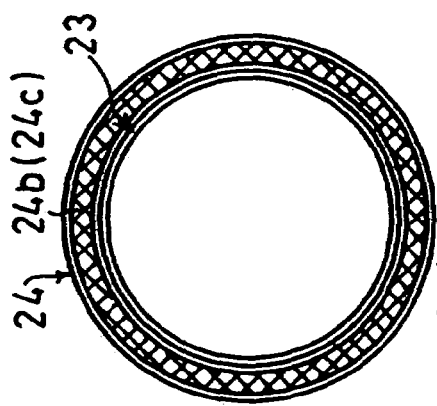
Figure 9F:
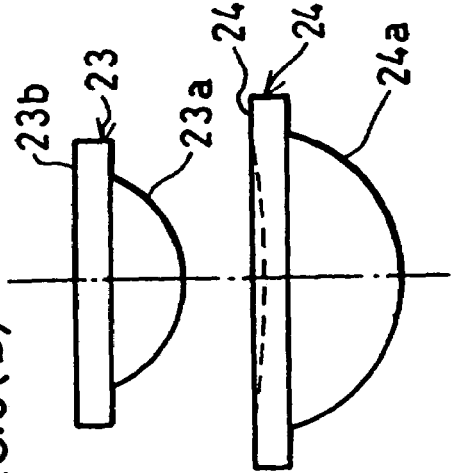

Furthermore, as shown in FIGS. 9(a) and 9(b), in the lens inclination detector 2 of the present embodiment, lenses 23 and 24 having a combined structure can be used instead of the lenses 21 and 22 having a combined structure.

As shown in FIGS. 9(a), 9(b), 9(c), and 9(d), the lens 23 is arranged such that the reflecting part 21c is not formed on the lens 21. A lens functioning section 23a corresponding to the lens functioning section 21a is provided, and a plane surface 23b corresponding to the plane surface 21b is provided.

As shown in FIGS. 9(a), 9(b), 9(e), and 9(f), the lens 24 is provided with a lens functioning section 24a, a plane surface 24b, and a reflecting part 24c, that respectively correspond to the lens functioning section 22a, the plane surface 22b, and the reflecting part 22c of the lens 22. Although the lens 24 is virtually identical to the lens 22, the plane surface 24b, i.e., a width of the reflecting part 24c is smaller than the plane surface 22b, i.e., a width of the reflecting part 22c.

With this arrangement, the plane surface 24b of the lens 24, i.e., a width of the reflecting part 24c is reduced so as to omit the reflecting part of the lens 23, thereby adjusting the balance between quantities of light reflected back from the lenses 23 and 24.

As described above, in view of quantities of light reflected back from the lenses, all the lenses do not require the reflecting part in the case of the combined lenses. Depending on quantities of light reflected from the lenses, the reflecting part may be provided on at least one of the lenses. In the case of such an arrangement as well, it is possible to detect relative inclination between the lenses and to adjust the inclination.

Further, the lenses 21 and 23 are described as planoconvex lenses, and the lenses 22 and 24 are described as lenses having concave and convex surfaces. Here, the curved surface (lens functioning section) having a lens function is not particularly limited in shape. For example, a lens having convex surfaces can be also adopted for the lenses 21 to 24.

Also, in the above description, two lenses are used in the combined structure; however, more lenses can be combined therein.

Embodiment 3

Figure 10:
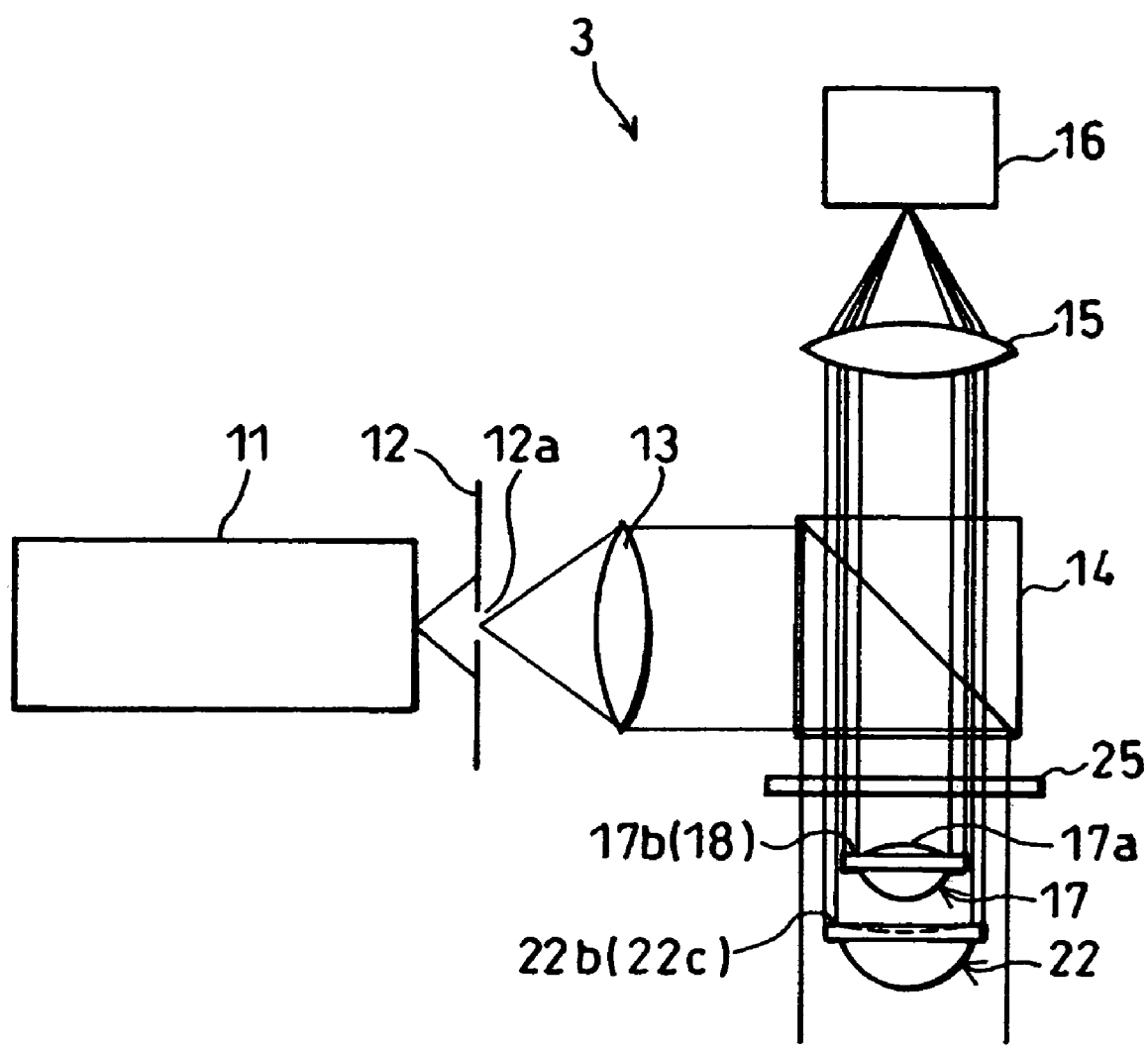
FIG. 10 is a schematic view showing the entire arrangement of a lens inclination detector in accordance with still another embodiment of the present invention.
Figure 11:
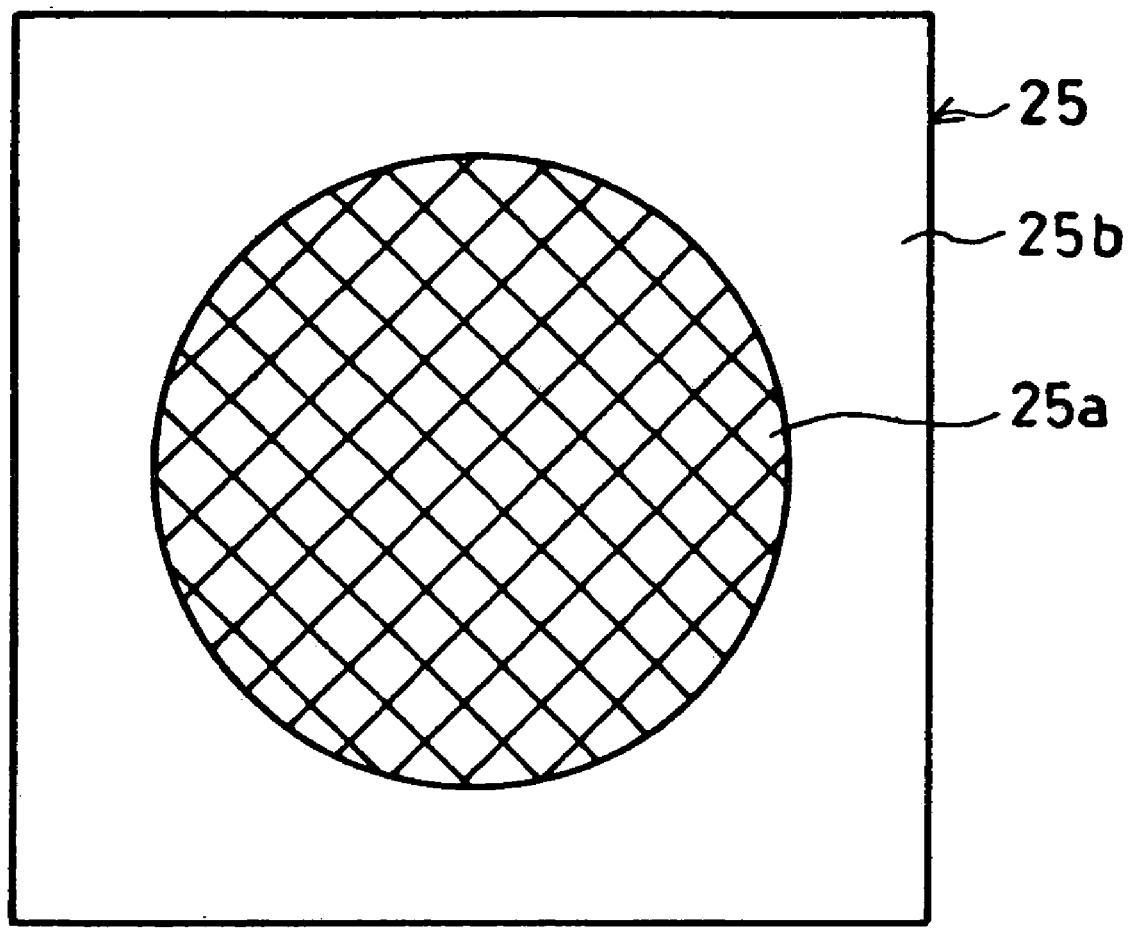
FIG. 11 is an elevational view showing a light-shielding member of FIG. 10.

Referring to FIGS. 10 and 11, the following explanation describes still another embodiment of the present invention. Here, for convenience of explanation, those means that have the same functions described in the means of the foregoing figures are indicated by the same reference numerals and the description thereof is omitted.

As shown in FIG. 10, a lens inclination detector 3 of the present embodiment is provided with the combined lens structure including a) a lens 17 as a small-diameter lens having convex surfaces and provided on the side facing a light source 11 and b) a lens 22 as a large-diameter lens having convex and concave surfaces. The outer diameter of the lens 17 is virtually the same as that of the lens functioning section 22a or smaller than that. The circumference of the lens 17 and the reflecting part 22c of the lens 22 do not overlap each other in a direction of an optical axis.

In an optical path between a beam splitter 14 and the lenses 17 and 22, a light-shielding member 25 is disposed. As shown in FIG. 11, the light-shielding member 25 is provided with a shielding part 25a for shielding light and a transmitting part 25b for transmitting light. The shielding part 25a is provided for preventing a light pencil emitted from the light source 11 from entering the lens functioning section 17a of the lens 17. The area of the shielding part 25a corresponds to that of the lens functioning section 17a.

This arrangement makes it possible to prevent light reflected on the lens functioning section 17a of the lens 17 from entering the light-receiving element 16 so as to improve accuracy of detecting the inclination of lens. When the lens functioning section 17a has a large radius of curvature and a larger quantity of light is likely to be emitted to the light-receiving element 16, this arrangement is particularly effective in shielding light.

Although the light-shielding member 25 is provided with the shielding part 25a and the transmitting part 25b, the transmitting part 25b is not mandatory. In the light-shielding member 25, the transmitting part 25b is provided such that a holding mechanism (not shown) supports the transmitting part 25b so as to dispose the shielding part 25a in an optical path without shielding it.

Moreover, the shielding part 25a is preferably capable of absorbing light to prevent stray light from entering the light-receiving element 16.

In the case of another embodiment as well, the light-shielding member 25 is capable of preventing light reflected on the curved surface of the lens from entering the light-receiving element 16 as mentioned above.

Embodiment 4

Figure 12:
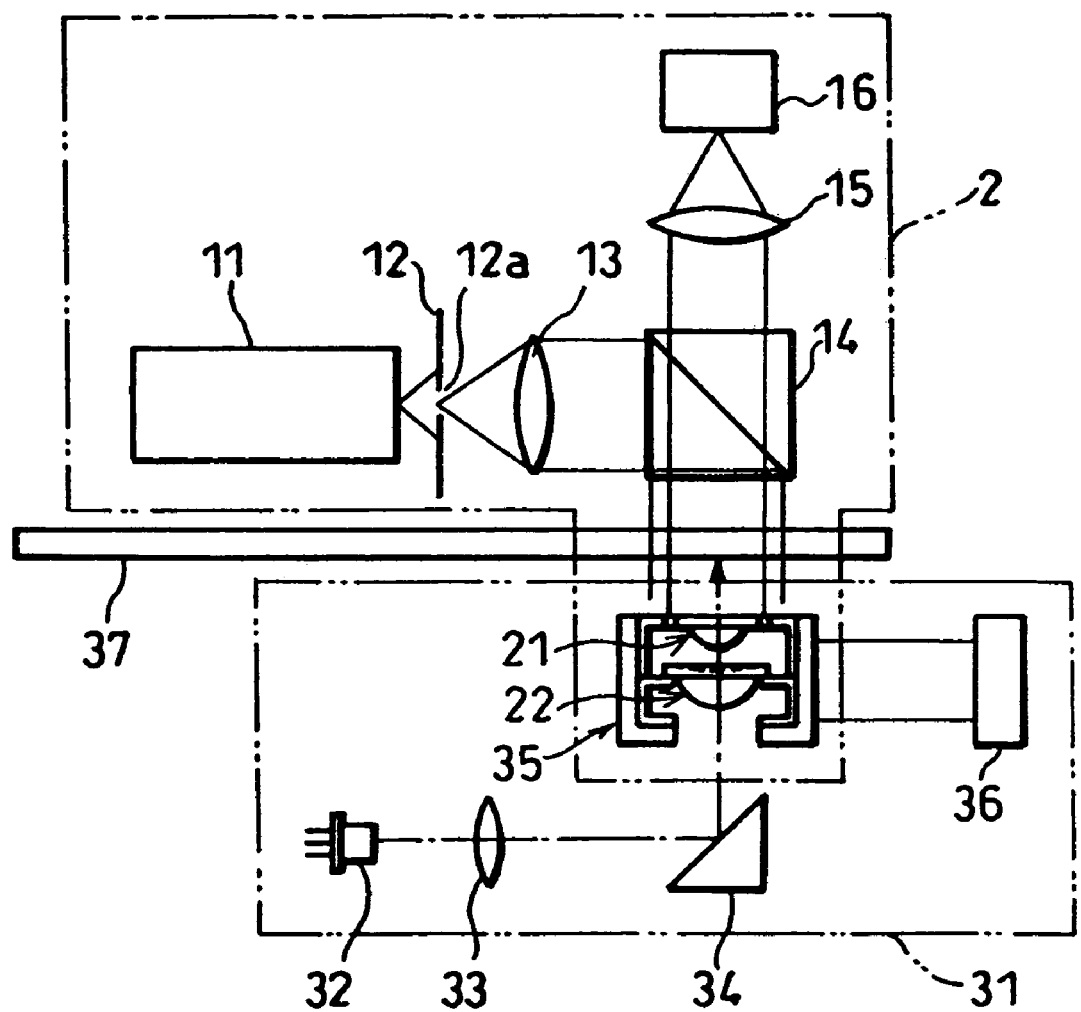
FIG. 12 is a schematic view showing the entire arrangement of an optical pickup device, which includes (adopts) the lens inclination detector of FIG. 5.
Figure 13A:
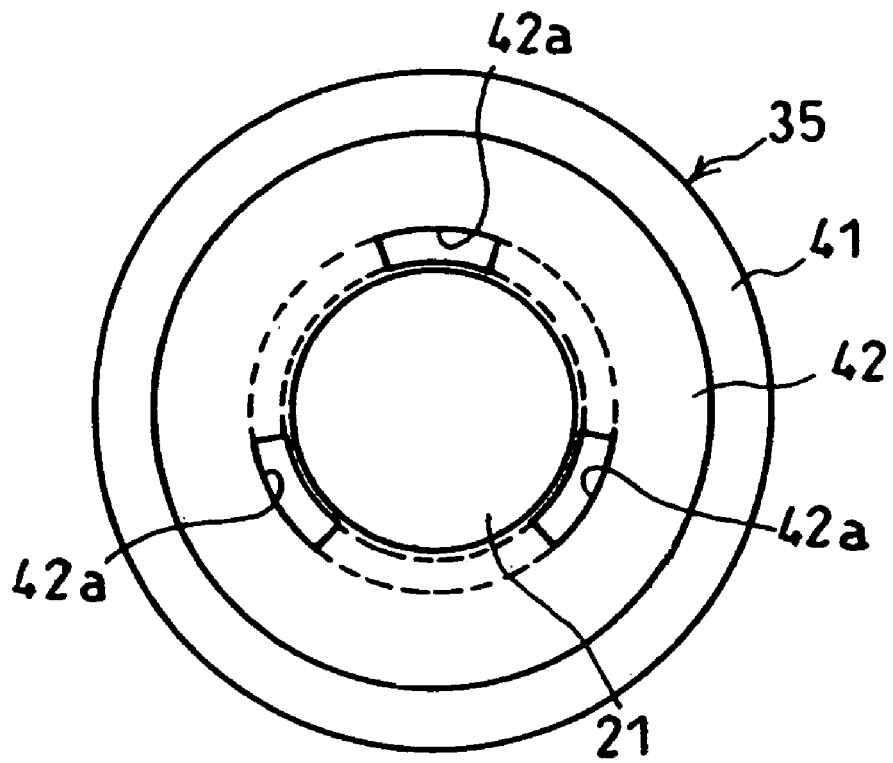
FIG. 13(*a*) is an elevational view showing a combined lens tube of FIG. 12, taken in an optical axis direction.
Figure 13B:
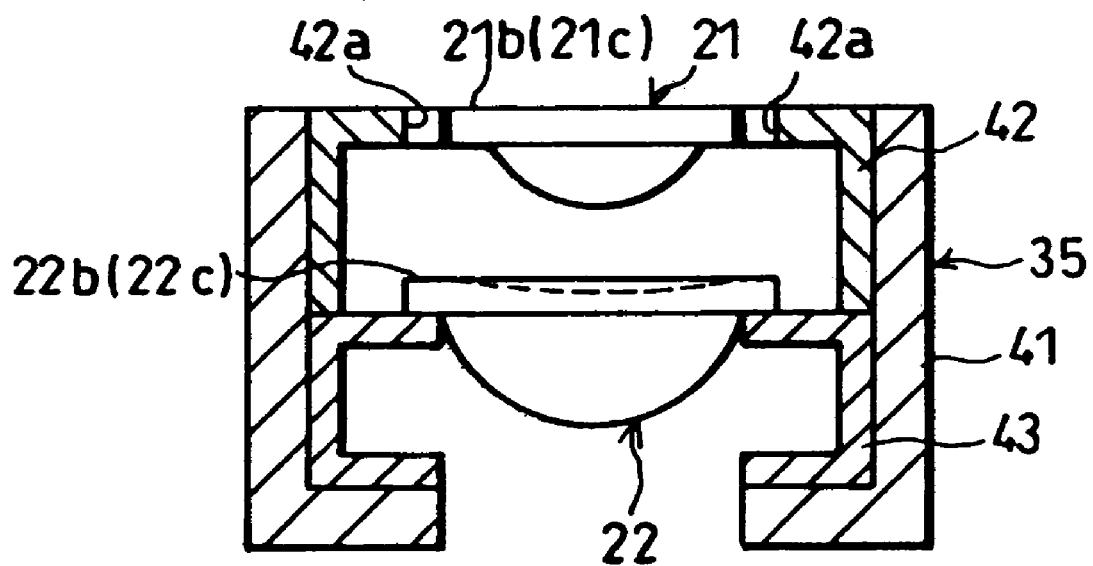

Referring to FIGS. 12, 13(a) and 13(b), the following explanation describes still another embodiment of the present invention. Here, for convenience of explanation, those means that have the same functions described in the means of the forgoing figures are indicated by the same reference numerals and the description thereof is omitted.

In the present embodiment, as shown in FIG. 12, a lens inclination detector 2 is used for detecting inclination of an object lens of an optical pickup device 31.

The optical pickup device 31 is provided with an LD (Laser Diode) light source 32, a collimate lens 33, a standing mirror 34, a combined lens tube 35 composed of lenses 21 and 22, a lens tube driving mechanism 36, and an inclination adjusting disk 37.

The collimate lens 33 converts light emitted from the LD light source 32 into parallel light. The standing mirror 34 directs light passing through the collimate lens 33 to the lenses 21 and 22 disposed in the combined lens tube 35. The mirror driving mechanism 36 drives the combined lens tube 35 and adjusts the inclination of the combined lens tube 35. The mechanism for adjusting inclination can be provided either inside the combined lens tube 35 or outside thereof. When the mechanism is disposed outside the tube 35, the combined lens tube 35 is fixed after inclination adjustment. Here, the lens tube driving mechanism 36 is equivalent to a tracking mechanism and a focusing mechanism of a general optical pickup device and has a conventional construction.

As shown in FIGS. 13(a) and 13(b), the combined lens tube 35 includes a cylinder 41. In the cylinder 41, a holding member 42 is provided for holding the lens 21, which is disposed between the lens 22 and an adjusting disk 37, and a holding member 43 for holding the lens 22, which is disposed between the lens 21 and the outside.

In the holding member 42, for example, three arc-shaped light-transmitting holes 42a are formed to transmit light for detecting the inclination of the lens. The positions of the light-transmitting holes 42a correspond to that of a reflecting part 22c on a plane surface 22b of the lens 22. With this arrangement, in the combined lens tube 35, the light-transmitting holes 42a are formed on the holding member 42, which overlaps the reflecting part 22c of the lens 22 in an optical axis direction, so as to secure an optical path for detecting lens inclination.

Regarding the above arrangement, the following explanation discusses a method for detecting inclination of the combined lens tube 35. Here, the lenses 21 and 22 are mounted into the combined lens tube 35 after inclination adjustment. Further, in the optical pickup device 31, the reference of inclination is, for example, a guide axis (not shown) for a seek of the optical pickup device 31. An optical axis of the lens inclination detector 2, the guide axis, and the inclination detecting disk 37 are previously fixed with predetermined inclination.

A parallel light pencil emitted from a light source 11 through a beam splitter 14 is reflected on the inclination detecting disk 37 and the plane surface and the reflecting part of the lens 21 or 22 before being directed to the combined lens tube 35, and the light forms a condensing spot on the light-receiving element 16 according to inclination. Here, the lenses 21 and 22 are fixed into the combined lens tube 35 after detecting inclination, so that the condensing spots of light reflected from the lenses 21 and 22 are formed on the same place on the light-receiving element 16.

Hence, on the light-receiving element 16, the inclination of the combined lens tube 35 is adjusted such that a condensing spot of light reflected from the inclination detecting disk 37 conforms to a condensing spot of light reflected from the combined lens tube 35, i.e., light reflected from lenses 21 and 22; thus, the inclination of the combined lens tube 35 can conform to the reference inclination of the optical pickup device 31. The inclination of the combined lens tube 35 is adjusted by the lens tube driving mechanism 36.

As described above, when the optical pickup device 31 is provided with a lens including a plane surface having a surface normal direction virtually conforming to an optical axis direction, or a combination including at least one lens or more, it is possible to readily detect and adjust the inclination of the lens acting as an object lens. Consequently, it is possible to improve the signal quality of an optical disk apparatus including the optical pickup device 31.

Embodiment 5

Figure 14A:
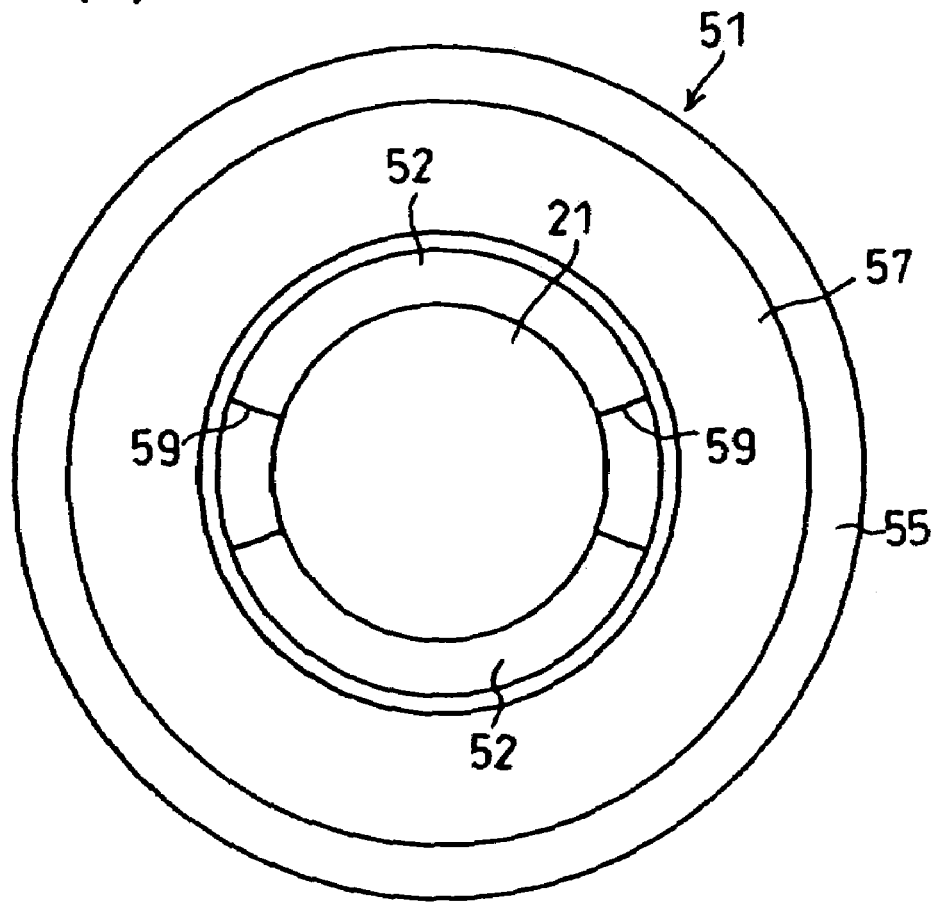
FIG. 14(*a*) is an elevational view showing another example of the combined lens tube shown in FIG. 13, taken in an optical axis direction.
Figure 14B:
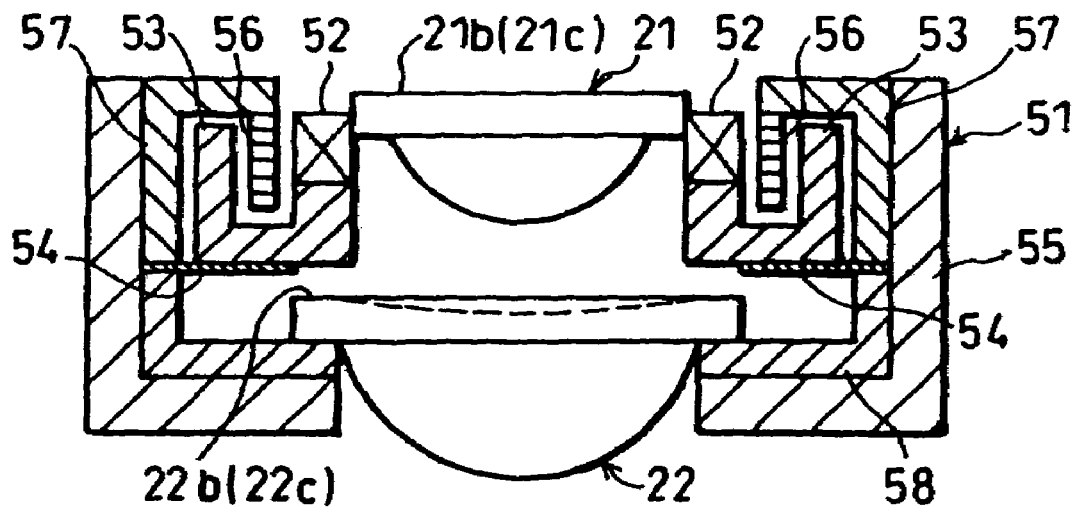
Figure 15:
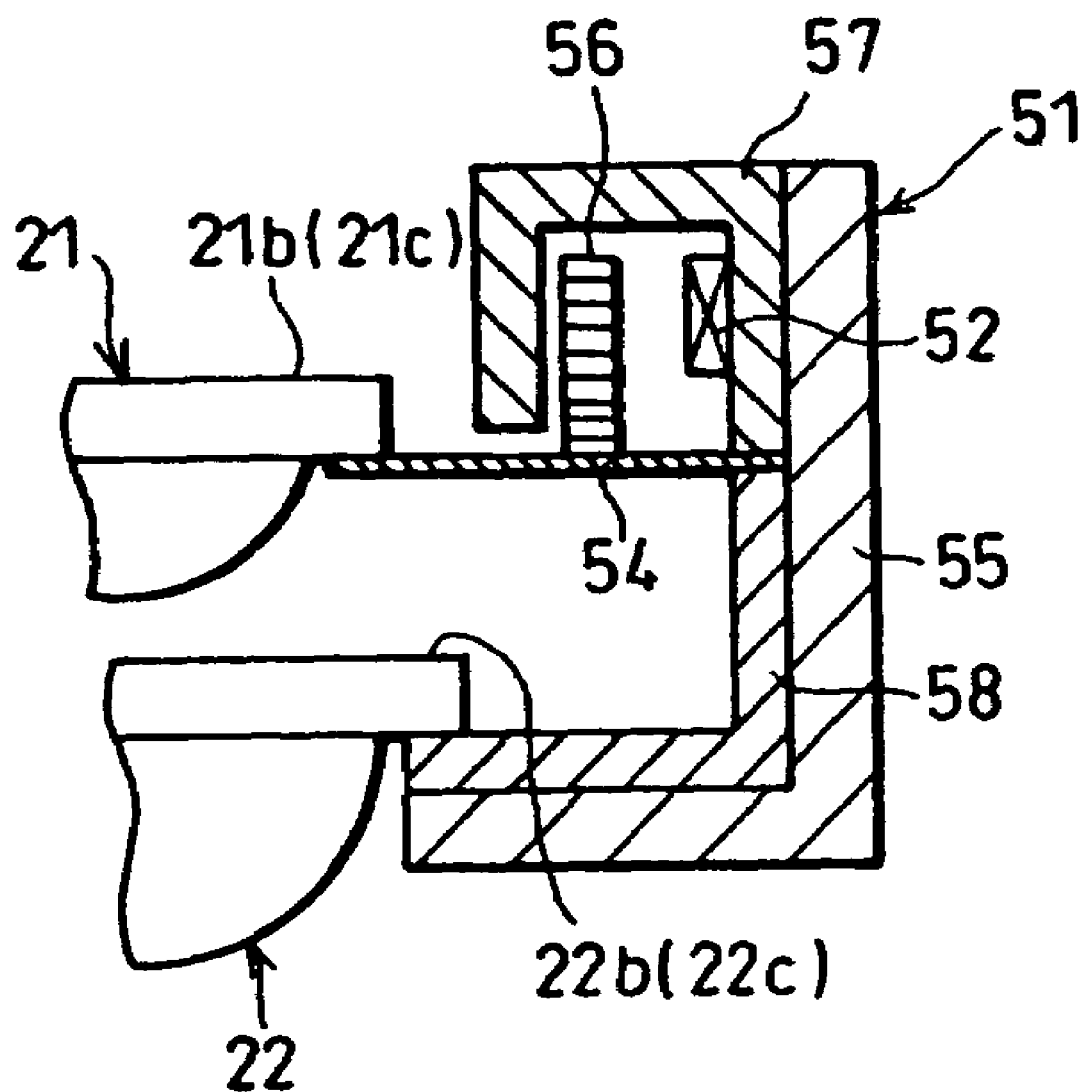
FIG. 15 is a longitudinal section showing another example of the combined lens tube shown in FIG. 14(*b*).
Figure 16:
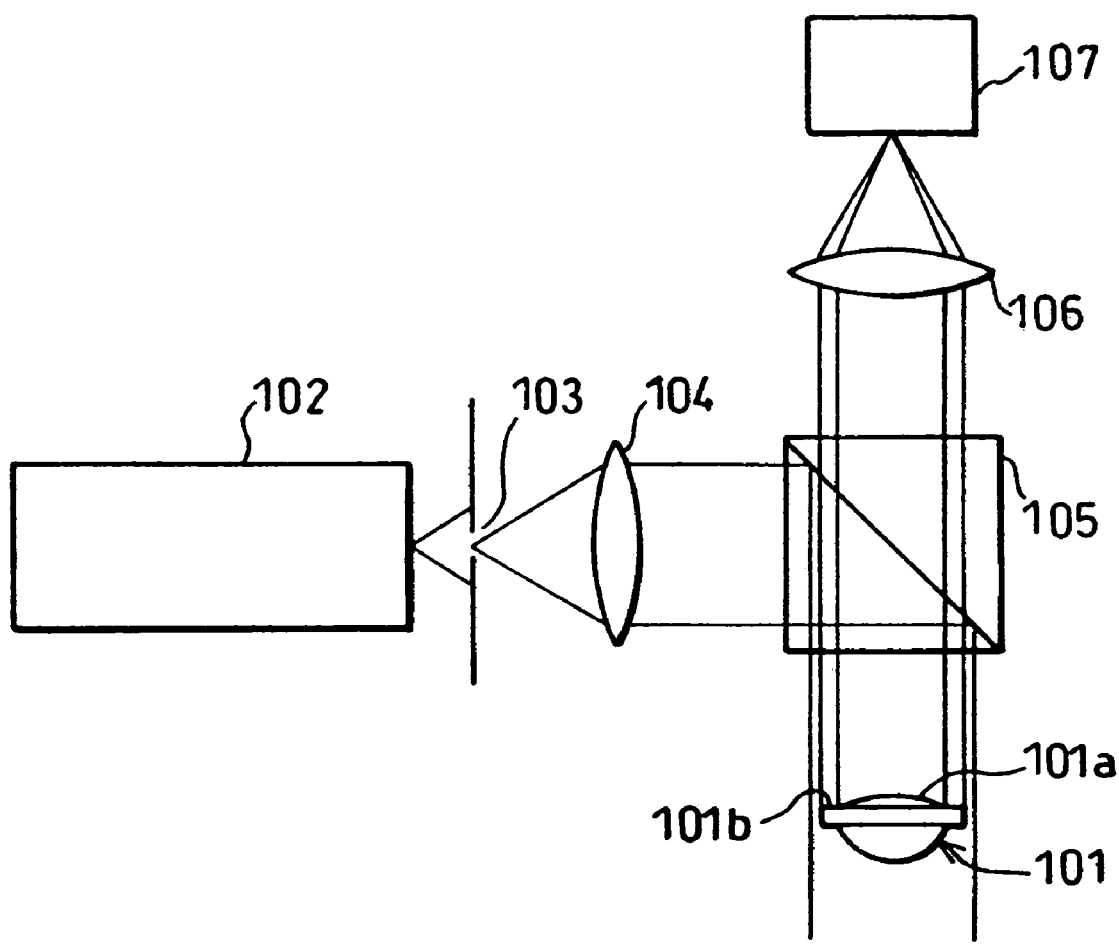
FIG. 16 is a schematic view showing the entire arrangement of a conventional lens inclination detector.

Referring to FIGS. 14(a), 14(b) and 15, the following explanation describes still another embodiment of the present invention. Here, for convenience of explanation, those means that have the same functions described in the means of the forgoing figures are indicated by the same reference numerals and the description thereof is omitted.

The present embodiment is arranged such that an optical pickup device 31 of FIG. 12 is provided with a combined lens tube 51 shown in FIGS. 14(a) and 14(b) in place of a combined lens tube 35. In the combined lens tube 51, one of the combined lenses (in this case, lens 21) is capable of independently moving in an optical axis direction so as to correct spherical aberration, which is caused by an error in thickness of an information recording medium (e.g. an optical disk) disposed on the position of an inclination adjusting disk 37.

As shown in FIG. 14(b), in the combined lens tube 51, the lens 21 is supported by an end of a leaf spring 54 via a magnet 52 and a yoke 53, and the other end of the leaf spring 54 is mounted into a cylinder 55. A coil 56 is disposed in a U-shaped part composed of the magnet 52 and the yoke 53 outside the magnet 52. The coil 56 is supported by the cylinder 55 via a supporting member 57. Further, the magnet 52, the yoke 53, and the coil 56 constitute a magnetic circuit. Current is applied to the coil 56 so as to move the lens 21 in an optical axis direction.

Meanwhile, the lens 22 is held by a lens holding member 58 provided in the cylinder 55 and is fixed therein.

Furthermore, as shown in FIG. 14(a), notches 59 are formed to secure optical paths for detecting lens inclination on the yoke 53, and the magnet 52 is divided at the notches 59.

Here, FIGS. 14(a) and 14(b) show a construction in which the coil 56 is disposed outside the magnet 52 in a direction of a diameter of the lens 21. However, as shown in FIG. 15, the positions of the coil 56 and the magnet 52 can be reversed.

Moreover, in the foregoing examples, regarding the holding members 42, 43, and 58 for holding the lenses 21 and 22 of a combined structure, the arrangement is not particularly limited. Namely, it is only necessary to allow a light pencil for detecting inclination to reach the plane surfaces of the lenses 21 and 22 or the reflecting part of the plane surface, by providing notches or holes on the holding member, the cylinder, and other members of the combined lens tube to secure the optical paths. This arrangement makes it possible to detect the inclination of the lenses 21 and 22 in a state in which the lenses 21 and 22 are mounted into the combined lens tube. Therefore, after the lenses 21 and 22 are mounted into the combined lens tube, an error in mounting the lenses 21 and 22 can be confirmed with ease.

Additionally, when the combined lens tube includes an inclination adjusting mechanism for the lenses 21 and 22, it is possible to fix the lenses 21 and 22 in the combined lens tube while measuring the inclination of the lenses 21 and 22. Thus, an error in mounting the lenses 21 and 22 can be reduced.

A lens inclination detector of the present invention, in which parallel light is emitted to a plane surface, and the inclination of the lens is detected based on the reflected light, the lens including the plane surface at a circumference thereof, the plane surface having a normal direction virtually conforming to an optical axis direction, is characterized by including on the plane surface a reflecting part for reflecting only parallel light within a predetermined waveband.

According to this arrangement, the reflecting part reflects light within a predetermined waveband and transmits light outside the waveband. Therefore, when the lens inclination detector is used for an optical pickup device, the reflecting part reflects light for detecting lens inclination and transmits light for performing recording and reproducing in the optical pickup device.

Consequently, when the lens inclination detector is used for the optical pick up device, the following adverse effect can be prevented: when light for recording and reproducing in the optical pickup device is reflected on the reflecting part, the reflected light is returned (stray light) to a light-receiving element and a light source of the optical pickup device, thereby causing malfunction in the optical pickup device.

In the lens inclination detector, the reflecting part can be composed of a dielectric film.

Further, the lens inclination detector can be also arranged such that the reflecting part is formed on the surface of the lens functioning section as well as on the plane surface, the lens functioning section being disposed at the inner radius of the plane surface and acting as a lens.

According to this arrangement, of reflecting parts composed of dielectric films, the reflecting part formed on the plane surface acts as a reflecting film which reflects light within a predetermined waveband, i.e., light for detecting lens inclination; meanwhile, the reflecting part formed on the lens functioning section acts as a reflection preventive film for preventing reflection of light on the surface of the lens, regarding light outside the waveband, e.g., light for recording and reproducing in the optical pickup device.

Therefore, when the lens inclination detector is used for the optical pickup device, it is possible to simultaneously form the reflecting film on the plane surface of the lens and the reflection preventive film of the lens functioning section as the reflecting film. Thus, the lens can be further mass-manufactured.

Moreover, a lens inclination detector of the present invention, in which a lens is provided, parallel light is emitted to a plane surface, and the inclination of the lens is detected based on the reflected light, the lens including the plane surface at a circumference thereof, the plane surface having a normal direction virtually conforming to an optical axis direction, is characterized in that a reflecting part for reflecting the parallel light is formed on the plane surface, and the reflecting part is composed of an aluminum film and a dielectric film that are stacked in this order on the plane surface.

According to this arrangement, the reflecting part has a laminated structure composed of an aluminum film and a dielectric film; hence, even when the plane surface of the lens is small, it is possible to efficiently reflect parallel light for detecting lens inclination. This arrangement makes it possible to further increase a quantity of reflected light at low cost without increasing a lens diameter. Additionally, the accuracy of detecting lens inclination can be improved.

Also, a lens inclination detector of the present invention, in which a lens is provided, parallel light is emitted to a plane surface, and the inclination of the lens is detected based on the reflected light, the lens including the plane surface at a circumference thereof, the plane surface having a normal direction virtually conforming to an optical axis direction, is characterized in that a plurality of the lenses are aligned in an optical axis direction, assuming that a receiving side of the parallel light is the front, the reflecting part for reflecting the parallel light is formed on the plane surface of one or more lenses disposed at the second and later from the front, and the diameter is set such that the reflecting part does not overlap the preceding lens in an optical axis direction.

According to this arrangement, regarding a combination of a plurality of lenses aligned in an optical axis direction, it is possible to detect the inclination of a predetermined lens having the reflecting part. Further, when the front of the front lens is flat, the lens can obtain light reflected from a wide area without forming the reflecting part. Therefore, in this case, the front side has a larger quantity of light so as to detect inclination with higher accuracy.

Moreover, when detecting parallel light reflected from the reflecting part, the lens diameter is set such that the reflecting part does not overlap the preceding lens in an optical axis direction, so that a detection operation can be positively carried out.

In the lens inclination detector, the following construction is also applicable: the lenses respectively have the reflecting parts which reflect the parallel light within different wavebands, and a reflected light separating means is provided for separating light reflected from the reflecting parts according to the wavebands.

According to this arrangement, parallel light components within different wavebands are respectively reflected as light reflected from the reflecting parts of the lenses (the waveband differs between the parallel light components). The reflected light within different wavebands is reflected on the reflected light separating means, and inclination is detected on each of the lenses based on each reflected and separated light. Hence, it is possible to separately and accurately detect the inclination of the lenses.

For example, the following construction is applicable: a white light source is used as a light source for detecting inclination, the reflecting parts of the two lenses respectively reflect blue light and red light, and the reflected light separating means such as a dichroic prism separates the reflected light.

With this arrangement, when a plurality of the lenses are mounted into the lens tube, the inclination amount of the lenses can be measured after mounting, so that an error in mounting can be readily confirmed. Moreover, when a lens inclination adjusting mechanism is mounted into the lens tube, an error in mounting can be reduced.

Further, the lens inclination detector can be also arranged such that the reflecting parts are formed so as to equalize quantities of light reflected from the lenses.

According to this arrangement, the reflecting parts are formed so as to equalize the quantities of light reflected from the lenses; thus, when light reflected from the lenses is detected by a single light-receiving element, it is possible to omit the step of adjusting the sensitivity of the light-receiving element according to a quantity of light reflected from each of the lenses and the step of controlling light emitted to the light-receiving element. This arrangement makes it possible to readily detect lens inclination.

Furthermore, the lens inclination detector can also have a construction in which a light-shielding member is provided in front of the front lens to prevent the parallel light from entering the lens functioning section, which is disposed at the inner radius of the plane surface and acts as a lens.

According to this arrangement, the light-shielding member can suppress the following adverse effect: the parallel light is emitted to the lens functioning section of the lens and the reflected light affects the accuracy of detecting lens inclination. Consequently, it is possible to improve the accuracy of detecting lens inclination.

A lens of the present invention is also arranged such that a plane surface has a normal direction virtually conforming to an optical axis direction and a reflecting part is provided on the plane surface to reflect only light within a predetermined waveband.

According to this arrangement, when the lens is used for an optical pickup device, the reflecting part reflects light for detecting lens inclination and transmit light for performing recording and reproducing in the optical pickup device. Consequently, the following adverse effect can be prevented: light for performing recording and reproducing in the optical pickup device is reflected on the reflecting part, and the reflected light is returned (stray light) to a light-receiving element and a light source of the optical pickup device, thereby causing malfunction in the optical pickup device.

The lens is also arranged such that the plane surface is formed at the circumference and the reflecting part is formed on a surface of a lens functioning section as well as on the plane surface, the lens functioning section being disposed at the inner radium of the plane surface and acting as a lens.

With this arrangement, of the reflecting parts, the reflecting part formed on the plane surface acts as a reflecting film which reflects light within a predetermined waveband, i.e., light for detecting lens inclination; meanwhile, the reflecting part formed on the lens functioning section acts as a reflection preventive film for preventing reflection of light on the surface of the lens, regarding light outside the waveband, e.g., light for performing recording and reproducing in the optical pickup device.

Therefore, when the lens is used for the optical pickup device, it is possible to simultaneously form the reflecting film on the plane surface of the lens and the reflection preventive film of the lens functioning section as the reflecting film. Thus, the lens can be further mass-manufactured.

Additionally, the lens of the present invention has a construction in which the plane surface has a normal direction virtually conforming to an optical axis direction, and the reflecting part is composed of an aluminum film and a dielectric film, that are stacked in this order on the plane surface, so as to reflect light.

With this arrangement, the reflecting part has a laminated structure composed of an aluminum film and a dielectric film; hence, even when the plane surface of the lens is small, it is possible to efficiently reflect parallel light for detecting lens inclination. This arrangement makes it possible to further increase a quantity of reflected light at low cost without increasing a lens diameter. Additionally, the accuracy of detecting lens inclination can be improved.

Further, the optical pickup device of the present invention, which emits light beam condensed by combined lenses to an optical recording medium, can also have a construction in which a plurality of the lenses constituting the combined lenses, each having the plane surface at the circumference on a surface facing the optical recording medium; of a plurality of the lenses, the reflecting part is formed at least on the plane surface of one of a plurality of the lenses so as to increase reflectivity of at least specific light emitted from the optical recording medium; and assuming that the side facing the optical recording medium is the front, the lens is larger in outer diameter than the preceding one.

With this arrangement, in the optical pickup device including a combination composed of a plurality of the lenses, which are aligned in an optical axis direction, it is possible to detect inclination of a predetermined lens on which the reflecting part is formed.

Moreover, assuming that the receiving side of parallel light is the front, the lens is larger in outer diameter than the preceding one; therefore, parallel light can be positively emitted onto the plane surface or the reflecting part at the circumference of each of the lenses. With this arrangement, regarding the combined lenses of the optical pickup device, it is possible to detect lens inclination based on light reflected from each of the lenses.

The optical pickup device can also have a construction in which, the front lens of a plurality of the lenses has a flat front and a convex rear and the reflecting parts are formed at the circumferences of the lenses disposed at the second and later from the front.

This arrangement makes it possible to obtain a sufficient quantity of light reflected entirely from the plane surface of the front lens without forming the reflecting part thereon. Therefore, it is not necessary to form the reflecting part on the lens at the front, thereby readily manufacturing the combined lenses, namely, the optical pickup device at low cost.

The optical pickup device can also have a construction in which the lenses are provided with the reflecting parts which reflect light within different wavebands.

According to this arrangement, a parallel light component is reflected as light reflected from the reflecting part of each of the lenses. The waveband differs between the parallel light components. The reflected light having different wavebands is reflected on the reflected light separating means, and inclination is detected regarding each of the lenses based on each reflected and separated light. Hence, it is possible to separately and accurately detect inclination of each of the lenses.

For example, the following construction is applicable: a white light source is used as a light source for detecting inclination, the reflecting parts of the two lenses respectively reflect blue light and green light, and the reflected light separating means such as a dichroic prism separates the reflected light.

With this arrangement, when a plurality of the lenses are mounted into the lens tube, the inclination amount can be measured on each of the lenses after mounting, so that an error in mounting can be readily confirmed. Moreover, when a lens inclination adjusting mechanism is mounted into the lens tube, an error in mounting can be reduced.

Further, the optical pickup device can also have a construction in which when parallel light is emitted to the combined lenses from the optical recording medium, the reflecting parts equalize quantities of light reflected from the lenses.

According to this arrangement, the reflecting parts equalize quantities of light reflected from the lenses; thus, when light reflected from the lenses is detected by a single light-receiving element, it is possible to omit the step of adjusting the sensitivity of the light-receiving element according to a quantity of light reflected from each of the lenses and the step of controlling light emitted to the light-receiving element. This arrangement makes it possible to readily detect lens inclination.

Furthermore, a method for detecting lens inclination of the present invention, which detects inclination of the combined lens composed of a plurality of the lenses, each including the plane surface at least at the circumference with a normal direction virtually conforming to an optical axis direction, is characterized in that parallel light is emitted to the combined lenses and the inclination of the combined lenses is detected based on the reflected light.

According to this arrangement, when detecting lens inclination, parallel light is emitted to the combined lenses composed of a plurality of lenses, it is possible to use reflected light, particularly light reflected from the plane surface whose normal direction virtually conforms to an optical axis direction. Hence, the lens inclination can be readily detected and adjusted with high accuracy.

Additionally, the lens inclination detecting method is also arranged such that the reflecting part is formed on the plane surface of at least one of the combined lenses, the reflecting part being provided for increasing reflectivity of the parallel light, and the inclination of the combined lenses is detected based on light reflected from the reflecting part.

With this arrangement, the reflecting part is formed on the plane surface of at least one of the combined lenses to increase reflectivity of parallel light, thereby detecting lens inclination with higher accuracy.

The method for detecting lens inclination of the present invention, in which parallel light is emitted to the lens so as to detect the inclination based on the reflected light, the lens including the plane surface at least at the circumference with a normal direction virtually conforming to an optical axis direction, is characterized in that when detecting inclination, the light-shielding member prevents the parallel light from entering the lens functioning section, which is disposed at the inner radius of the plane surface and acts as a lens.

According to this arrangement, the light-shielding member can suppress the following adverse effect: the parallel light is emitted to the lens functioning section of the lens and the reflected light affects accuracy of detecting lens inclination. Consequently, it is possible to improve accuracy of detecting lens inclination, namely, accuracy of adjusting inclination.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens, comprising a plane surface whose normal direction virtually conforms to an optical axis direction,
   said plane surface being provided with a reflecting part for reflecting only light within a predetermined waveband and for transmitting light outside the predetermined waveband,
   wherein said plane surface is formed at a circumference of said lens, and said reflecting part is formed on a surface of a lens functioning section as well as on said plane surface, said lens functioning section acting as a lens at an inner radius of said plane surface.

2. An optical pickup device comprising:
   a plurality of lenses disposed along an optical axis, one direction along said optical axis being a forward direction and the other direction along said optical axis being a backward direction,
   each of said plurality of lenses (a) being larger in diameter than the lenses disposed forwardly along said optical axis relative thereto, and (b) having a plane surface on a surface thereof that faces in said forward direction, said plane surface being disposed virtually perpendicular to said optical axis and being for reflecting light entering from a front side thereof.

3. The optical pickup device as defined in claim 2, wherein each said lens includes a curved surface having a function as a lens, and
   at least one of said lenses includes a reflecting part on said plane surface, said reflecting part reflecting light within a predetermined waveband with reflectivity higher than said curved surface.

4. The optical pickup device as defined in claim 3, wherein each said lens includes said reflecting part, and
   a wavelength differs between lenses regarding light reflected on said reflecting part of each said lens.

5. The optical pickup device as defined in claim 2, wherein a reflecting part is formed on at least one of said lenses such that each said lens is equal in quantity of light reflected thereon for detecting inclination.

6. The optical pickup device as defined in claim 5, wherein said reflecting part is formed on said plane surface of each said lens, and
   said reflecting part has a thickness such that each said lens is equal in quantity of light reflected thereon for detecting inclination.

7. The optical pickup device as defined in claim 5, wherein said reflecting part is formed on said plane surface of each said lens, and
   said reflecting part has an area such that each said lens is equal in quantity of light reflected thereon for detecting inclination.

8. An optical pickup device, which emits a light beam condensed by combined lenses to an optical recording medium,
   wherein a plurality of lenses constituting the combined lenses each have a plane surface on a surface thereof, that faces an optical recording medium at a circumference of said lens, said plane surface (a) having a normal direction virtually conforming to an optical axis, and (b) being capable of reflecting light that enters into the surface that faces said optical recording medium,
   wherein a reflecting part is formed on at least said plane surface of one or more of said plurality of lenses, said reflecting part increasing reflectivity of at least specific light received from the direction of the optical recording medium, and wherein said lenses of said plurality of lenses successively increase in outer diameter from a smallest diameter closest to said optical recording medium to a largest diameter furthest from said optical recording medium.

9. The optical pickup device as defined in claim 8, wherein a front lens of said plurality of lenses is a plano-convex lens including a plane surface at a front and a convex surface at a rear, and said reflecting part is formed at the circumference of at least one of said plurality of lenses disposed rearwardly of said front lens.

10. The optical pickup device as defined in claim 8, wherein said lenses are provided with said reflecting parts, each part reflecting light within a different waveband.

11. The optical pickup device as defined in claim 8, wherein said reflecting part is formed such that when parallel light is emitted to said combined lenses from the direction of the optical recording medium, each said lens is equal in quantity of light reflected thereon.

12. A method for detecting lens inclination comprising:
a step 'a' of emitting light for detecting inclination to a plurality of lenses so as to emit the light to plane surfaces thereof, said lenses being disposed along an optical axis direction with predetermined intervals, said plane surfaces being disposed in a virtually perpendicular direction to an optical axis,
a step 'b' of detecting a position of a condensing spot formed by light reflected from said plane surface of each said lens.

13. The method for detecting lens inclination as defined in claim 12, wherein in the step 'a', parallel light is used as the light for detecting inclination.

14. The method for detecting lens inclination as defined in claim 12, wherein in the step 'a', light is reflected on a reflecting part provided on said plane surface of at least one of said lenses so as to form a condensing spot, which is larger in quantity of light than that of a spot formed by light reflected on a lens functioning section provided on each said lens, and
in the step 'b', the position of the condensing spot is detected.

15. The method for detecting lens inclination as defined in claim 12, wherein in the step 'a', light within a different waveband for each said lens is reflected on a reflecting part provided on said plane surface of each said lens, and light reflected from said reflecting parts are separated from each other.

16. The method for detecting lens inclination as defined in claim 12, wherein in the step 'a', the light for detecting inclination is emitted to a reflecting part provided on said plane surface of each said lens, and light equal in quantity is reflected on each said reflecting part.

17. The method for detecting lens inclination as defined in claim 12, wherein in the step 'a', the light for detecting inclination is not emitted to a lens functioning part provided on each said lens but only to said plane surface.

18. A method for detecting lens inclination, that detects inclination of combined lenses including a plurality of lenses, comprising the steps of:
emitting parallel light to each of said plurality of lenses and detecting inclination of said combined lenses based on light reflected therefrom,
the plurality of lenses being disposed along an optical axis having a forward direction and a backward direction therealong,
each of said plurality of lenses (a) being larger in diameter than any of the ones of said plurality of lenses disposed forwardly with respect thereto along said optical axis, and (b) having a plane surface on a surface thereof, said plane surface facing forwardly relative to said optical axis, being virtually perpendicular thereto and being capable of reflecting light impinging thereon.

19. The method for detecting lens inclination as defined in claim 18, wherein a reflecting part for increasing reflectivity of the parallel light is formed on said plane surface of at least one of said lenses included in said combined lenses, and
inclination of said combined lenses is detected based on light reflected from said reflecting part.

20. The method for detecting lens inclination as set forth in claim 18, wherein:
a reflecting part for increasing reflectivity of parallel light is formed on each plane surface of at least two of said lenses included in said combined lens;
each said reflecting part being adapted to increase the reflectivity of light in a different waveband from others of said reflecting parts; and
said inclination of said combined lens is detected based on light reflected from said reflecting parts.

21. The method for detecting lens inclination as defined in claim 18, wherein the light for detecting inclination is emitted to a reflecting part provided on said plane surface of each said lens, and light equal in quantity is reflected on each said reflecting part.

22. The method for detecting lens inclination as defined in claim 18, wherein the light for detecting inclination is not emitted to a lens functioning part provided on each said lens but only to said plane surface.

23. A method for detecting lens inclination, in which parallel light is emitted to a lens and inclination of the lens is detected based on light reflected therefrom, said lens including a plane surface at least at a circumference thereof and a lens functioning section, said plane surface having a normal direction virtually conforming to an optical axis direction, and said lens functioning section having an area perpendicular to said optical axis direction defined by an inner radius of said plane surface,
said method comprising the step of, upon detecting inclination, preventing the parallel light from entering said lens functioning section by using a light-shielding member having a light-shielding area that corresponds to said area of said lens functioning section.

24. An optical pickup device comprising:
a plurality of lenses disposed along an optical axis, one direction along said optical axis being a forward direction and the other direction along said optical axis being a backward direction, each of said plurality of lenses (a) being larger in diameter than the lenses disposed forwardly along said optical axis relative thereto, and (b) having a plane surface on a surface thereof that faces in said forward direction, said plane surface being disposed virtually perpendicular to said optical axis and being capable of reflecting light entering from a front side thereof,
wherein each said lens includes a curved surface having a function as a lens, and
defines a reflecting part on its plane surface, said reflecting parts of said lenses reflecting light within a predetermined waveband with reflectivity higher than said curved surface, and a wavelength differs between lenses regarding light reflected on said reflecting part of each said lens.

25. An optical pickup device comprising:
a plurality of lenses disposed along an optical axis, one direction along said optical axis being a forward direction and the other direction along said optical axis being a backward direction, each of said plurality of lenses (a) being larger in diameter than the lenses disposed forwardly along said optical axis relative thereto, and
- (b) having a plane surface on a surface thereof that faces in said forward direction, said plane surface being disposed virtually perpendicular to said optical axis and being capable of reflecting light entering from a front side thereof,
wherein said plane surface defines a reflecting part such that each said lens is equal in quantity of light reflected thereon for detecting inclination.

26. The optical pickup device as defined in claim 25, wherein said reflecting part is formed on said plane surface of each said lens, and
said reflecting part has a thickness such that each said lens is equal in quantity of light reflected thereon for detecting inclination.

27. The optical pickup device as defined in claim 25, wherein said reflecting part is formed on said plane surface of each said lens, and
said reflecting part has an area such that each said lens is equal in quantity of light reflected thereon for detecting inclination.

28. An optical pickup device, which emits a light beam condensed by combined lenses to an optical recording medium,
wherein a plurality of lenses constituting the combined lenses each have a plane surface on a surface thereof, that faces an optical recording medium at a circumference of said lens, said plane surface having a normal direction virtually conforming to an optical axis,
wherein a reflecting part is formed on at least said plane surface of each of said plurality of lenses, each said reflecting part reflecting light within a different waveband so as to increase reflectivity of at least specific light received from the direction of the optical recording medium, and
wherein said lenses of said plurality of lenses successively increase in outer diameter from a smallest diameter closest to said optical recording medium to a largest diameter furthest from said optical recording medium.

29. An optical pickup device, which emits a light beam condensed by combined lenses to an optical recording medium,
wherein a plurality of lenses constituting the combined lenses each have a plane surface on a surface thereof, that faces an optical recording medium at a circumference of said lens, said plane surface having a normal direction virtually conforming to an optical axis,
wherein a reflecting part is formed on at least said plane surface of one or more of said plurality of lenses, each said reflecting part being formed such that when parallel light is emitted to said combined lenses from the optical recording medium, each said lens is equal in quantity of light reflected thereon so as to increase reflectivity of at least specific light received from the direction of the optical recording medium, and
wherein said lenses of said plurality of lenses successively increase in outer diameter from a smallest diameter closest to said optical recording medium to a largest diameter furthest from said optical recording medium.

* * * * *